(12) United States Patent
Xu et al.

(10) Patent No.: US 12,166,823 B2
(45) Date of Patent: Dec. 10, 2024

(54) BARE-METAL CONNECTION STORAGE METHOD AND SYSTEM, AND APPARATUS

(71) Applicant: Huawei Cloud Computing Technologies Co., Ltd., Guizhou (CN)

(72) Inventors: An Xu, Beijing (CN); Zhenghui Liu, Xi'an (CN); Zhenxing Liu, Xi'an (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

(21) Appl. No.: 18/189,573

(22) Filed: Mar. 24, 2023

(65) Prior Publication Data

US 2023/0231915 A1 Jul. 20, 2023

Related U.S. Application Data

(63) Continuation of application No. PCT/CN2021/119967, filed on Sep. 23, 2021.

(30) Foreign Application Priority Data

Sep. 27, 2020 (CN) .......................... 202011034957.X

(51) Int. Cl.
| | |
|---|---|
| *G06F 15/177* | (2006.01) |
| *H04L 9/40* | (2022.01) |
| *H04L 12/46* | (2006.01) |
| *H04L 41/0803* | (2022.01) |
| *H04L 67/1097* | (2022.01) |

(52) U.S. Cl.
CPC ...... *H04L 67/1097* (2013.01); *H04L 12/4641* (2013.01); *H04L 41/0803* (2013.01); *H04L 63/08* (2013.01); *H04L 63/101* (2013.01)

(58) Field of Classification Search
CPC ............ H04L 67/1097; H04L 12/4641; H04L 41/0803; H04L 63/08; H04L 63/101; H04L 63/0272; H04L 63/083; H04L 61/103; H04L 2101/622; H04L 61/5014; H04L 41/0806
See application file for complete search history.

(56) References Cited

U.S. PATENT DOCUMENTS

| | | | |
|---|---|---|---|
| 9,171,024 B1 | 10/2015 | Vaikar | |
| 10,171,344 B1 | 1/2019 | Venkataramanan et al. | |
| 11,496,519 B1* | 11/2022 | Gupta | ................... H04L 9/0891 |
| 2016/0241643 A1 | 8/2016 | Astigarraga et al. | |
| 2018/0167415 A1* | 6/2018 | Khan | ..................... H04W 12/08 |
| 2019/0251266 A1* | 8/2019 | Tuttle | .................... G06F 21/575 |
| 2021/0334123 A1* | 10/2021 | Lent | ..................... G06F 9/4411 |

FOREIGN PATENT DOCUMENTS

| | | |
|---|---|---|
| CN | 106375176 A | 2/2017 |
| CN | 109302466 A | 2/2019 |
| CN | 110753093 A | 2/2020 |

* cited by examiner

*Primary Examiner* — John B Walsh
(74) *Attorney, Agent, or Firm* — WOMBLE BOND DICKINSON (US) LLP

(57) ABSTRACT

A bare-metal connection storage method includes establishing a storage network, where the storage network includes a plurality of bare-metals, an access switch, a core switch, and a storage device. The plurality of bare-metals are coupled to the access switch, the access switch is coupled to the core switch, and the core switch is coupled to the storage device. The method configures the storage network, so that each of the plurality of bare-metals is coupled to the storage device.

20 Claims, 10 Drawing Sheets

BARE-METAL CONNECTION STORAGE METHOD AND SYSTEM, AND APPARATUS

CROSS-REFERENCE TO RELATED APPLICATIONS

This application is a continuation of International Application No. PCT/CN2021/119967, filed on Sep. 23, 2021, which claims priority to Chinese Patent Application No. 202011034957.X, filed on Sep. 27, 2020. The disclosure of which is hereby incorporated by reference in its entirety.

TECHNICAL FIELD

This application relates to the field of computer technologies, and in particular, to a bare-metal connection storage method and system, and an apparatus.

BACKGROUND

A cloud platform usually includes a storage network. The storage network includes a plurality of bare-metals and a storage device. Each of the plurality of bare-metals can access the storage device, and the plurality of bare-metals can communicate with each other. Therefore, when a bare-metal sends data to the storage device, another bare-metal may intercept the data, and consequently the data is leaked.

Therefore, how to securely connect the bare-metal to the storage device, that is, how to prevent, when a bare-metal sends data to the storage device, another bare-metal from intercepting the data, is still a technical challenge.

SUMMARY

Embodiments of this application provide a bare-metal connection storage method and system, and an apparatus, so that a plurality of bare-metals can be separated from each other in a multi-tenant scenario, and security of connecting the bare-metal to a storage device is improved.

In some embodiments, an embodiment of this application provides a bare-metal connection storage method. The method is applied to a cloud management platform, and the method includes: establishing a storage network, where the storage network includes a plurality of bare-metals, an access switch, a core switch, and a storage device, the plurality of bare-metals are connected to the access switch, the plurality of access switches are connected to the core switch, and the core switch is connected to the storage device; and configuring the storage network, so that each of the plurality of bare-metals is interconnected with the storage device, and any two of the plurality of bare-metals are separated from each other.

In the foregoing method, the storage network including the plurality of bare-metals, the access switch, the core switch, and the storage device is established. Through configuration of the storage network, different bare-metals are separated from each other, and each bare-metal in the storage network is interconnected only with the storage device. This effectively prevents the bare-metal from maliciously intercepting a message sent by another bare-metal, prevents data leakage in the storage device, and improves security performance of the bare-metal and the storage device in a multi-tenant scenario.

In some embodiments, the plurality of bare-metals include a first bare-metal and a second bare-metal, and the configuring the storage network may be: separating the first bare-metal and the second bare-metal on the access switch over a multiplex virtual local area network MUX-VLAN, where the first bare-metal and the second bare-metal are separately connected to the access switch, and the first bare-metal and the second bare-metal are located in a same VLAN and a same subnet.

In some embodiments, the first bare-metal and the second bare-metal are any two of the plurality of bare-metals. When the first bare-metal and the second bare-metal are connected to a same access switch, and a VLAN and a subnet in which the first bare-metal is located are respectively the same as a VLAN and a subnet in which the second bare-metal is located, the first bare-metal and the second bare-metal may be separated by using the MUX-VLAN. In this way, layer-2 traffic separation between bare-metals in a same VLAN and a same subnet is implemented, an event of malicious message interception between bare-metals is effectively prevented, and security of the bare-metal is improved.

In some embodiments, the plurality of bare-metals include a first bare-metal and a second bare-metal, and the configuring the storage network may be: setting a first access control list on the access switch to separate the first bare-metal and the second bare-metal, where the first bare-metal and the second bare-metal are separately connected to the access switch, and the first bare-metal and the second bare-metal are located in a same VLAN and a same subnet.

In some embodiments, the first bare-metal and the second bare-metal are any two of the plurality of bare-metals. When the first bare-metal and the second bare-metal are connected to a same access switch, and a VLAN and a subnet in which the first bare-metal is located are respectively the same as a VLAN and a subnet in which the second bare-metal is located, an access control list (ACL) is set on the access switch, so that the first bare-metal is not interconnected with the second bare-metal. In this way, layer-2 traffic separation between bare-metals in a same VLAN and a same subnet is implemented, an event of malicious message interception between bare-metals is effectively prevented, and security performance of the bare-metal is improved.

In some embodiments, the plurality of bare-metals further include a third bare-metal and a fourth bare-metal, and the configuring the storage network may be: setting a second access control list on the core switch to separate the third bare-metal and the fourth bare-metal, where the third bare-metal and the fourth bare-metal are separately connected to the core switch by using different access switches, and the third bare-metal and the fourth bare-metal are located in different subnets.

In some embodiments, the third bare-metal and the fourth bare-metal are any two of the plurality of bare-metals. When an access switch connected to the third bare-metal is different from an access switch connected to the fourth bare-metal, and a subnet in which the third bare-metal is located is different from a subnet in which the fourth bare-metal is located, an ACL is set on the core switch to prohibit an interconnection between the third bare-metal and the fourth bare-metal. In this way, layer-3 traffic separation between bare-metals cross subnets is implemented, an event of malicious message interception between bare-metals is effectively prevented, and security performance of the bare-metal in a multi-tenant case is improved.

In some embodiments, the configuring the storage network includes: setting a third access control list on the core switch, so that each of the plurality of bare-metals is interconnected with the storage device, where each bare-metal and the storage device are located in different VLANs and different subnets.

In some embodiments, the bare-metal and the storage device in the storage network are located in different VLANs and different subnets, and an ACL is set on the core switch, so that each bare-metal is interconnected with the storage device. In this way, layer-3 traffic interworking between the bare-metal and the storage device cross VLANs and cross subnets is implemented.

In some embodiments, when the storage network further includes a computing node, the configuring the storage network further includes: setting a fourth access control list on the core switch, so that each of the plurality of bare-metals is separated from the computing node, where each bare-metal and the computing node are located in different VLANs and different subnets.

If there is the computing node in the storage network, the computing node and the bare-metal are located in different VLANs and different subnets, and an ACL is set on the core switch, so that each of the plurality of bare-metals is not interconnected with the computing node. In this way, layer-3 traffic separation between the bare-metal and the computing node cross VLANs and cross subnets is implemented, the computing node is prevented from maliciously intercepting a message sent by the bare-metal, and security performance of the bare-metal is improved.

In some embodiments, an IP address of each of the plurality of bare-metals is automatically configured based on a subnet of an access switch connected to each bare-metal and a MAC address of each bare-metal.

An IP address is allocated to a target bare-metal with reference to the subnet of the access switch connected to the bare-metal and the MAC address of the bare-metal; in other words, a subnet in which the target bare-metal is located is determined based on the access switch, and a host ID of the target bare-metal in the subnet is determined based on a MAC address of the target bare-metal. In this way, the IP address of the target bare-metal is automatically allocated, a case such as a configuration error or repetition that occurs when the IP address of the bare-metal is manually configured is avoided, and efficiency and accuracy of configuring the IP address of the bare-metal are improved.

In some embodiments, after each of the plurality of bare-metals is interconnected with the storage device, and before each bare-metal accesses the storage device, CHAP authentication initiated by the storage device on each bare-metal succeeds.

The bare-metal may be interconnected with the storage device. If the CHAP authentication initiated by the storage device on each bare-metal succeeds, the bare-metal has permission to use the storage device. In other words, the CHAP authentication on the bare-metal succeeds, so that the storage device determines that an identity of the bare-metal is valid. Therefore, the storage device can be used by the bare-metal. This effectively prevents brute-force cracking of the bare-metal and improves security of connecting the bare-metal to the storage device in the multi-tenant scenario.

In some embodiments, each of the plurality of bare-metals corresponds to one group of user names and user passwords used for the CHAP authentication, and different bare-metals correspond to different user names and user passwords.

One group of user names and user passwords used for the CHAP authentication are allocated to each bare-metal in the storage network, and the user name and the user password used by each bare-metal for the CHAP authentication are unique. Both the user name and the user password are randomly generated, and therefore the bare-metal is effectively prevented from being spoofed to obtain data in the storage device, and security of connecting the bare-metal to the storage device in the multi-tenant scenario is improved.

In some embodiments, the configuring the storage network is: configuring the storage network by using an access control list or by using an access control list and a multiplex virtual local area network MUX-VLAN.

In some embodiments, this application provides an apparatus. The apparatus includes: an establishment unit, configured to establish a storage network, where the storage network includes a plurality of bare-metals, an access switch, a core switch, and a storage device, the plurality of bare-metals are connected to the access switch, the plurality of access switches are connected to the core switch, and the core switch is connected to the storage device; and a configuration unit, configured to configure the storage network, so that each of the plurality of bare-metals is interconnected with the storage device, and any two of the plurality of bare-metals are separated from each other.

In some embodiments, the plurality of bare-metals include a first bare-metal and a second bare-metal, and the configuration unit is configured to separate the first bare-metal and the second bare-metal on the access switch over a multiplex virtual local area network MUX-VLAN, where the first bare-metal and the second bare-metal are separately connected to the access switch, and the first bare-metal and the second bare-metal are located in a same VLAN and a same subnet.

In some embodiments, the plurality of bare-metals include a first bare-metal and a second bare-metal, and the configuration unit is configured to set a first access control list on the access switch to separate the first bare-metal and the second bare-metal, where the first bare-metal and the second bare-metal are separately connected to the access switch, and the first bare-metal and the second bare-metal are located in a same VLAN and a same subnet.

In some embodiments, the plurality of bare-metals further include a third bare-metal and a fourth bare-metal, and the configuration unit is configured to set a second access control list on the core switch to separate the third bare-metal and the fourth bare-metal, where the third bare-metal and the fourth bare-metal are separately connected to the core switch by using different access switches, and the third bare-metal and the fourth bare-metal are located in different subnets.

In some embodiments, the configuration unit is configured to set a third access control list on the core switch, so that each of the plurality of bare-metals is interconnected with the storage device, where each bare-metal and the storage device are located in different VLANs and different subnets.

In some embodiments, when the storage network further includes a computing node, the configuration unit is further configured to set a fourth access control list on the core switch, so that each of the plurality of bare-metals is separated from the computing node, where each bare-metal and the computing node are located in different VLANs and different subnets.

In some embodiments, an IP address of each of the plurality of bare-metals is automatically configured based on a subnet of an access switch connected to each bare-metal and a MAC address of each bare-metal.

In some embodiments, after each of the plurality of bare-metals is interconnected with the storage device, and before each bare-metal accesses the storage device, CHAP authentication initiated by the storage device on each bare-metal succeeds.

In some embodiments, each of the plurality of bare-metals corresponds to one group of user names and user passwords used for the CHAP authentication, and different bare-metals correspond to different user names and user passwords.

In some embodiments, the configuration unit is configured to configure the storage network by using an access control list or by using an access control list and a multiplex virtual local area network MUX-VLAN.

In some embodiments, this application provides a bare-metal storage system. The storage system includes a plurality of bare-metals, an access switch, a core switch, and a storage device. The plurality of bare-metals are connected to the access switch, the plurality of access switches are connected to the core switch, and the core switch is connected to the storage device. Each of the plurality of bare-metals is interconnected with the storage device, and any two of the plurality of bare-metals are separated from each other.

In some embodiments, the plurality of bare-metals include a first bare-metal and a second bare-metal; and
 a multiplex virtual local area network MUX-VLAN is set on the access switch, the MUX-VLAN enables the first bare-metal to be separated from the second bare-metal, the first bare-metal and the second bare-metal are separately connected to the access switch, and the first bare-metal and the second bare-metal are located in a same VLAN and a same subnet.

In some embodiments, the plurality of bare-metals include a first bare-metal and a second bare-metal; and
 a first access control list is set on the access switch, the first access control list enables the first bare-metal to be separated from the second bare-metal, the first bare-metal and the second bare-metal are separately connected to the access switch, and the first bare-metal and the second bare-metal are located in a same VLAN and a same subnet.

In some embodiments, the plurality of bare-metals further include a third bare-metal and a fourth bare-metal; and a second access control list is set on the core switch, the second access control list enables the third bare-metal to be separated from the fourth bare-metal, the third bare-metal and the fourth bare-metal are separately connected to the core switch by using different access switches, and the third bare-metal and the fourth bare-metal are located in different subnets.

In some embodiments, a third access control list is set on the core switch, the third access control list enables each of the plurality of bare-metals to be interconnected with the storage device, and each bare-metal and the storage device are located in different VLANs and different subnets.

In some embodiments, when the storage system further includes a computing node, a fourth access control list is further set on the core switch, the fourth access control list enables each of the plurality of bare-metals to be separated from the computing node, and each bare-metal and the computing node are located in different VLANs and different subnets.

In some embodiments, an IP address of each of the plurality of bare-metals is automatically configured based on a subnet of an access switch connected to each bare-metal and a MAC address of each bare-metal.

In some embodiments, after each of the plurality of bare-metals is interconnected with the storage device, and before each bare-metal accesses the storage device, CHAP authentication initiated by the storage device on each bare-metal succeeds.

In some embodiments, each of the plurality of bare-metals corresponds to one group of user names and user passwords used for the CHAP authentication, and different bare-metals correspond to different user names and user passwords.

In some embodiments, this application provides an apparatus. The apparatus includes a processor and a memory. The processor and the memory are connected or coupled by using a bus. The memory is configured to store program instructions. The processor invokes the program instructions in the memory, to perform the method in some embodiments.

In some embodiments, this application provides a computer-readable storage medium. The computer-readable storage medium stores program code to be executed by an apparatus, and the program code includes instructions used to perform the method in some embodiments.

In some embodiments, this application provides a computer software product. The computer program software product includes program instructions. When the computer software product is executed by an apparatus, the apparatus performs the method in any of the embodiments discussed herein. The computer software product may be a software installation package. When the method provided in any possible design for the embodiments discussed herein, the computer software product may be downloaded and executed on the apparatus, to implement the method in any of the embodiments discussed herein.

BRIEF DESCRIPTION OF DRAWINGS

To describe technical solutions in embodiments of this application more clearly, the following briefly describes the accompanying drawings used for describing embodiments. It is clear that the accompanying drawings in the following descriptions show merely some embodiments of this application, and a person of ordinary skill in the art may still derive other accompanying drawings from these accompanying drawings without creative efforts.

DESCRIPTION OF EMBODIMENTS

Figure 1:
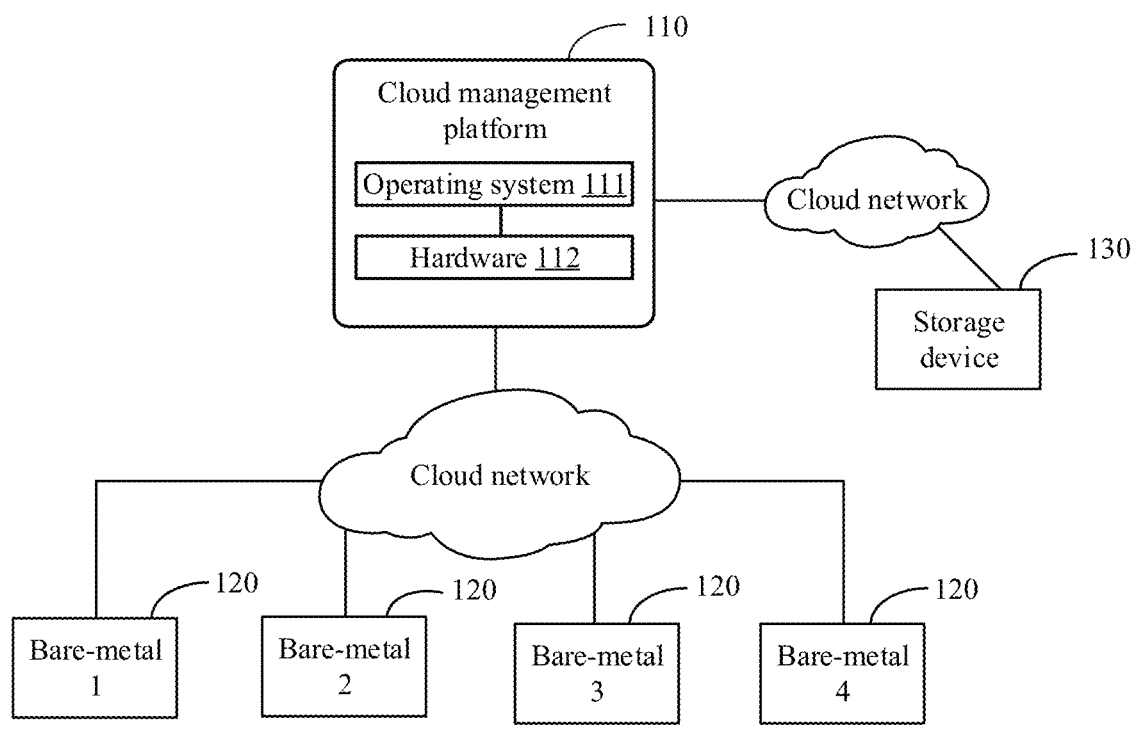
FIG. 1 is a schematic diagram of an architecture of a system according to an embodiment of this application.

Terms used in embodiments of this application are merely for the purpose of describing embodiments, but are not intended to limit this application. In the specification and claims in embodiments of this application, terms "first", "second", and the like are intended to distinguish between different objects but do not indicate a particular order of the objects.

For ease of understanding, the following first describes related terms that may be used in embodiments of this application.

(1) Internet Small Computer System Interface iSCSI

An Internet small computer system interface (iSCSI) is also referred to as an IP storage area network (SAN). The iSCSI is an industry standard for transmitting a SCSI block command in an existing IP network based on a TCP/IP protocol, and is a storage technology in which a message and block data can be simultaneously transmitted without a need to install a separate fiber network in the existing IP network. The iSCSI is based on the TCP/IP protocol. The iSCSI encapsulates a SCSI command/data block into an iSCSI packet, encapsulates the iSCSI packet into a TCP packet, and then encapsulates the TCP packet into an IP packet that may be transmitted by using a router or a switch on a standard Ethernet device.

The iSCSI is a typical client/server (C/S) architecture. A host device that accesses a storage system is referred to as an iSCSI client or host or an iSCSI initiator (iSCSI initiator). A storage device that provides a storage service is referred to as a server, and the server may also be referred to as a target. A main function of the iSCSI is to perform a large quantity of data encapsulation and reliable transmission processes between the host device (the initiator) and the storage device (the target) by using a TCP/IP network.

(2) Challenge Handshake Authentication Protocol CHAP

CHAP is short for a PPP (point-to-point protocol) challenge handshake authentication protocol. In the protocol, an identity of a peer end may be periodically checked through three-way handshakes. The checking may be repeated when an initial link is established, when the link is established, or after the link is established. By using an incrementally changing identifier and a variable query value, a replay attack from an endpoint may be prevented, and use of duplicate checking can limit time of exposure to a single attack. CHAP is often used in a remote access environment of an enterprise network.

In some embodiments, in a first operation, after a link establishment phase ends, an authenticator sends a "challenge" message to a peer endpoint; in a second operation, the peer endpoint responds with a value calculated by using a one-way hash function; in a third operation, the authenticator checks the response based on a hash value calculated by the authenticator, and if the values match, the authentication is acknowledged, or otherwise, a connection needs to be terminated; and in a fourth operation, after a random interval, the authenticator sends a new "challenge" message to the endpoint, and repeats the first operation to the third operation. The authenticator can control verification frequency and time.

FIG. 1 is a schematic diagram of a structure of an application system according to an embodiment of this application. As shown in FIG. 1, the application system in this application includes a cloud management platform 110, a plurality of bare-metals 120, and a storage device 130. Each of the plurality of bare-metals 120 is connected to the cloud management platform 110 by using a network, and the storage device 130 is connected to the cloud management platform 110 by using the network. It should be noted that any two of the plurality of bare-metals 120 cannot be interconnected with each other, and each of the plurality of bare-metals 120 may be interconnected with the storage device 130.

The cloud management platform 110 includes an operating system 111 and hardware 112. The cloud management platform 110 may be an AWS (Amazon Web Service), OpenStack, CloudStack, or the like used to provide an IAAS service. The operating system 111 may be an embedded operating system, a Unix-like operating system, or the like. For example, the embedded operating system may be VxWorks, eCos, Symbian OS, or Palm OS, a graphical operating system may be Microsoft Windows, MacOS X, or the like, and the Unix-like operating system may be System V, BSD, Linux, or the like. The hardware 112 may include a processor, a memory, a physical network interface card, and the like.

The storage device 130 supports an iSCSI technology, that is, provides storage space for the plurality of bare-metals 120 by using the network. The storage device of this type provides a bare logical volume without a file system for the plurality of bare-metals 120, and each logical volume has a unique bare-metal unit number (Logical Unit Number, LUN).

Each of the plurality of bare-metals 120 is a physical server that can automatically complete operating system installation, storage configuration, and network configuration, for example, a bare-metal server (BMS). As shown in FIG. 1, each of the plurality of bare-metals 120 corresponds to one tenant. The tenant and the bare-metal are in a one-to-one mapping relationship, and an operating system of the bare-metal may be customized and installed by the tenant. In some possible embodiments, the tenant and the bare-metal in the application system may alternatively be in a one-to-many correspondence. One tenant may lease a plurality of bare-metals. For example, a bare-metal 1 and a bare-metal 2 correspond to a same tenant, and in this case, it is still set that different bare-metals cannot be interconnected with each other, but each bare-metal can communicate with the storage device 10, to improve security of connecting the bare-metal to the storage device. In some embodiments, when a requirement for system security is not so high, bare-metals belonging to a same tenant may be interconnected with each other, but bare-metals corresponding to different tenants cannot be interconnected with each other.

Figure 2:
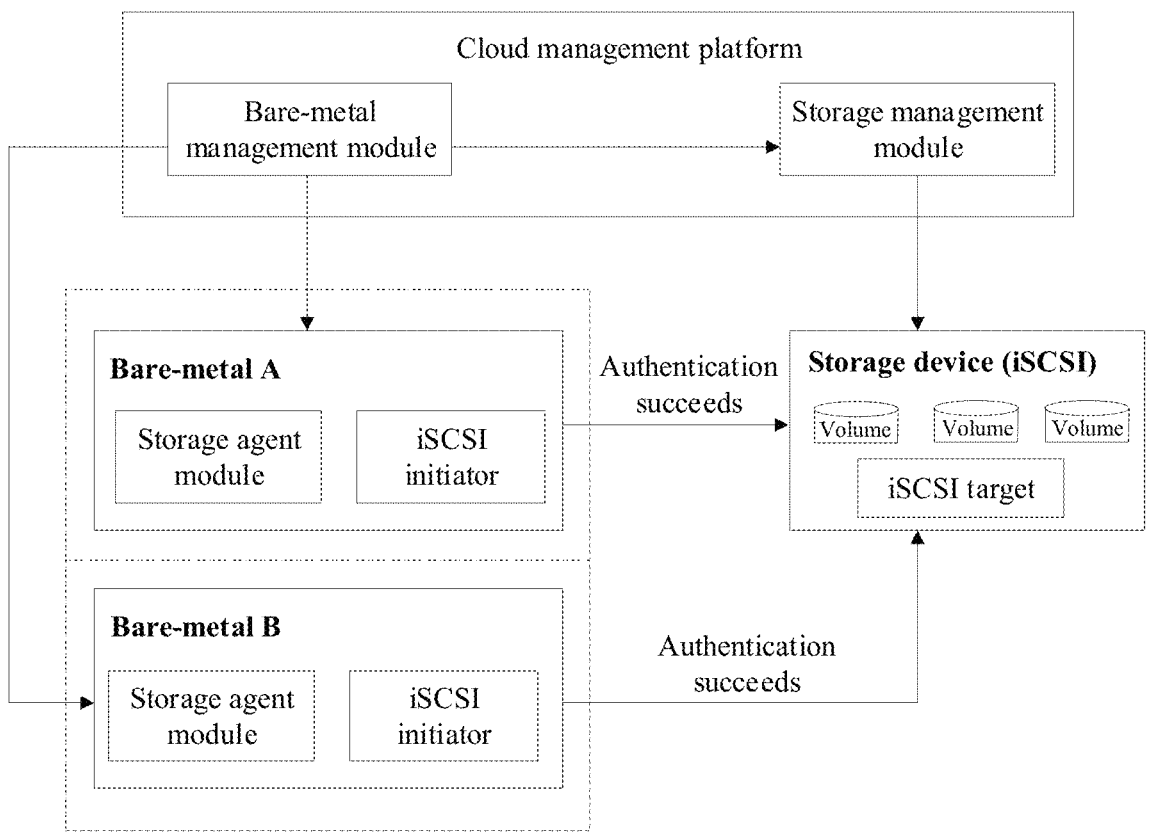
FIG. 2 is a schematic diagram of a structure of a system according to an embodiment of this application.

Based on the system architecture shown in FIG. 1, a process in which the plurality of bare-metals 120 are connected to the storage device 130 is further described with reference to FIG. 2. FIG. 2 is a schematic diagram of a structure of a system according to this application. Both a bare-metal management module and a storage management module belong to the cloud management platform 110 in FIG. 1. In some possible embodiments, the bare-metal management module may be a component that is on the cloud management platform 110 and that is configured to provide a computing service, for example, a Nova component. The storage management module may be a component that is on the cloud management platform 110 and that is configured to provide storage, for example, a Cinder component. In FIG. 2, a bare-metal A and a bare-metal B are not interconnected with each other, the bare-metal A may communicate with a storage device, and the bare-metal B may communicate with the storage device. The storage device supports an iSCSI protocol. Therefore, an iSCSI target is integrated into the storage device, and correspondingly, an iSCSI initiator is integrated into the bare-metal A and the bare-metal B separately. In this application, when security authentication (such as CHAP authentication) initiated by the storage device on the bare-metal A (or the bare-metal B) succeeds, the iSCSI initiator in the bare-metal A (or the bare-metal B) may communicate with the iSCSI target in the storage device. It should be noted that, in FIG. 2, the bare-metal A and the bare-metal B are merely examples of a plurality of bare-metals, and a quantity of the plurality of bare-metals is not limited to 2.

As shown in FIG. 2, as an example for description, the bare-metal A is connected to the storage device. A basic procedure in which the bare-metal A is connected to the storage device is as follows: A tenant sends a request for creating a "volume (or referred to as a block device)" for the bare-metal A to the storage management module on the cloud management platform, and the storage management module creates a "volume" in the storage device and records a correspondence between the created "volume" and the bare-metal A; and the tenant sends a request for mounting a "volume" to the bare-metal management module on the cloud management platform, and after receiving the request for mounting the "volume", the bare-metal management module obtains metadata of the "volume" corresponding to the bare-metal A from the storage management module, and the bare-metal management module transfers the metadata of the "volume" to a storage agent module in the bare-metal A, that is, mounts the "volume" on the bare-metal A. If the bare-metal A can be interconnected with the storage device, and when the bare-metal A needs to access a volume in the iSCSI storage device, if authentication on the bare-metal A succeeds, the storage agent module in the bare-metal A invokes, based on metadata of the "volume", the iSCSI initiator in the bare-metal to access and use the "volume".

In a related technology, for a process in which the bare-metal is connected to the storage device, refer to the foregoing descriptions of connecting the bare-metal A to the storage device. However, a difference is: In the related technology, when a plurality of bare-metals are connected to the storage device, because a storage network is a common virtual local area network (VLAN), bare-metals connected to a same storage device may be interconnected with each other by using the storage network, and there is no separation capability, and therefore a high-risk event such as data leakage and transmission packet interception is very likely to occur in a multi-tenant scenario, and a great security risk exists. In addition, in the related technology, the bare-metal is not limited to access the storage device only when authentication on the bare-metal succeeds, and therefore a tenant of another bare-metal may forge an iSCSI initiator in the bare-metal as an iSCSI initiator in a known bare-metal in a brute-force cracking manner, to access a volume in a storage device corresponding to the known bare-metal to read private data from the volume or write damaging data. For example, simulation of growth of an identification number is used as an example. It is assumed that a correspondence between the bare-metal A (an identification number of an iSCSI initiator is 1) and a LUN 1 and a LUN 2 and a correspondence between the bare-metal B (an identification number of an iSCSI initiator is 2) and a LUN 3 and a LUN 4 are established on the storage management module, but related mapping information of a bare-metal C is not established on the storage management module. It is assumed that the bare-metal C is to access the storage device, and the bare-metal C brute-force cracks the iSCSI initiator by simulating growth of the identification number. For example, when the identification number 2 (the iSCSI initiator in the bare-metal B is simulated) is tested, the LUN 3 and the LUN 4 in the storage device may be accessed. Consequently, data information in the storage device is leaked, and a security coefficient is low. In addition, IP of a bare-metal node is often manually configured, which is not easy to use and less secure.

This application provides a connection storage method for a bare-metal tenant, so that not only bare-metals of a plurality of tenants can be separated, but brute-force cracking of an iSCSI initiator in the bare-metal can also be effectively prevented, and an IP address of the bare-metal is automatically configured. Therefore, security of connecting the bare-metal to the storage device is significantly improved, and security of an entire system is significantly improved.

Based on the system architecture described above, there are three objectives.

(1) If a secure connection between the bare-metal and the storage device is to be implemented, separation between bare-metals in various networking forms and an interconnection between the bare-metal and the storage device in a storage network need to be preset. For example, the bare-metal A, the bare-metal B, and the storage device in FIG. 2 are used as an example to separate the bare-metal A and the bare-metal B. When the bare-metal A sends a message to the outside, the bare-metal B cannot intercept the message, and similarly, when the bare-metal B sends a message to the outside, the bare-metal A cannot intercept the message. In addition, the bare-metal A and the storage device are interconnected; in other words, the bare-metal A may send a message to the storage device, and the storage device may also send a message to the bare-metal A. In addition, the bare-metal B and the storage device are interconnected, and this is similar to the interconnection between the bare-metal A and the storage device. Details are not described herein again.

(2) Automatically configure IP of the bare-metal. The bare-metal management module automatically configures an IP address of the bare-metal based on a subnet in which a target switch connected to the bare-metal is located and a media access control address (MAC) of a storage network interface card in the bare-metal.

(3) Prevent brute-force cracking of an iSCSI initiator in the bare-metal. The bare-metal A and the storage device in FIG. 2 are used as an example. Before the bare-metal A reads data in the storage device or writes data into the storage device, the bare-metal A further needs to perform security authentication with the storage device. The bare-metal A has permission to read data in the storage device or write data into the storage device only after the bare-metal A is successfully authenticated. In some embodiments, CHAP authentication may be used for security authentication between the bare-metal and the storage device.

Implementation processes of the foregoing three objectives are sequentially described below.

First, the foregoing objective (1) is described; in other words, separation and interconnections between bare-metals in various networking forms in the storage network are set. The interconnection means that the bare-metal can communicate only with the storage device, and the separation means that the bare-metals cannot communicate with each other. In some possible embodiments, if there is also a computing node in the networking, the separation further means that the bare-metal cannot communicate with the computing node.

In this embodiment of this application, in a multi-tenant environment, separation and interconnections of bare-metals in various networking forms may be controlled based on at least one of a multiplex virtual local area network (Multiplex VLAN, MUX-VLAN) technology and an access control list (ACL) technology. The MUX-VLAN technology is used to implement separation between bare-metals located in a same VLAN and a same subnet. In other words, the MUX-VLAN technology may implement layer-2 traffic separation. The ACL technology may be used to implement separation between bare-metals located in a same VLAN and a same subnet (that is, layer-2 traffic separation), and may also be used to implement separation between bare-metals located in a same VLAN and different subnets and implement separation between bare-metals located in different VLANs and different subnets (that is, layer-3 traffic separation). In addition, the ACL technology is also used to implement the interconnection between the bare-metal and the storage device. The bare-metal and the storage device are located in different VLANs and different subnets.

In some possible embodiments, if there is also a computing node (such as a virtual machine) in addition to the bare-metal in the networking of the storage network, when the bare-metal and the computing node are located in a same VLAN and different subnets or are located in different VLANs and different subnets, the ACL technology may also implement separation between the bare-metal and the computing node. It should be noted that, if whether a subnet of the bare-metal A is the same as a subnet of the bare-metal B is to be determined, an AND operation is performed on an IP address of the bare-metal and a subnet mask corresponding to the bare-metal to obtain a subnet address, and then, whether a subnet address of the bare-metal A is the same as a subnet address of the bare-metal B is determined through comparison, and if the subnet address of the bare-metal A is the same as the subnet address of the bare-metal B, it indicates that the bare-metal A and the bare-metal B are located in a same subnet.

The MUX-VLAN provides a mechanism for controlling network resources by using a VLAN. MUX-VLANs are classified into a principal VLAN and a subordinate VLAN (Subordinate VLAN). Subordinate VLANs are further classified into a separate subordinate VLAN (Separate VLAN) and a group subordinate VLAN (which is also referred to as a group VLAN). The subordinate VLAN needs to be bound to the principal VLAN, and each principal VLAN supports only one separate subordinate VLAN but a plurality of group subordinate VLANs. An interface in the principal VLAN can communicate with all interfaces in the MUX-VLAN, an interface in the separate subordinate VLAN can communicate only with the interface in the principal VLAN and is totally separated from other types of interfaces, an interface in the group subordinate VLAN can communicate with the interface in the principal VLAN, and interfaces in a same group can also communicate with each other, but cannot communicate with another group of interfaces or separate ports.

The ACL technology is a flow control technology based on packet filtering. In the ACL, a series of different rules may be defined. A device classifies data packets based on these rules and processes different packets. In this way, network access behaviors can be controlled, network traffic can be limited, network performance can be improved, a network attack can be prevented, and so on. The ACL can effectively control access of a network user to a network resource, can be targeted to network applications of two network devices, and can also implement large-scale access control management based on a subnet, that is, implement communication and separation between network devices, and provide an effective means for the network application.

Figure 3:
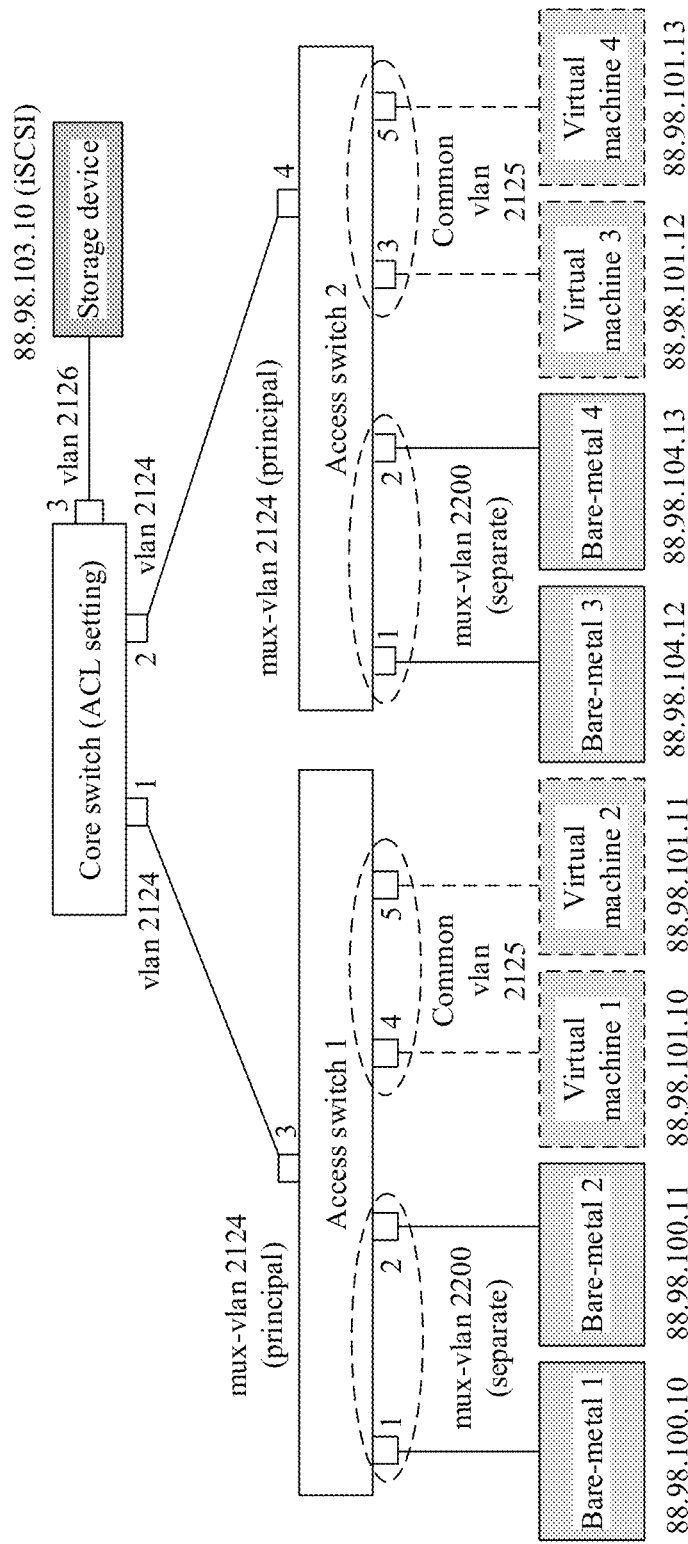
FIG. 3 is a schematic diagram of networking of bare-metals according to an embodiment of this application.

FIG. 3 is a schematic diagram of networking of bare-metals according to an embodiment of this application. As shown in FIG. 3, in this scenario, there are a bare-metal 1, a bare-metal 2, a bare-metal 3, a bare-metal 4, two access switches (an access switch 1 and an access switch 2), a core switch, and a storage device. Before connections of the components are described, for ease of description, for each switch, interfaces of the switches are sequentially represented as a first interface, a second interface, and the like in a sequence from left to right. However, names of the interfaces of the switches are not limited in this application. In some embodiments, the bare-metal 1 is connected to a first interface of the access switch 1, the bare-metal 2 is connected to a second interface of the access switch 1, the bare-metal 3 is connected to a first interface of the access switch 2, the bare-metal 4 is connected to a second interface of the access switch 2, a third interface of the access switch 1 is connected to a first interface of the core switch, a fourth interface of the access switch 2 is connected to a second interface of the core switch, and a third interface of the core switch is connected to the storage device.

In the core switch, VLAN IDs of both the first interface and the second interface are set to 2124, and a VLAN ID of the third interface is set to 2126. In the access switch 1, a VLAN ID of the third interface is set to 2124, and a VLAN 2124 of the third interface is configured as a principal VLAN in a MUX-VLAN; and VLAN IDs of both the first interface and the second interface are set to 2200, a VLAN 2200 is configured as a separate subordinate VLAN in a subordinate VLAN, and the separate subordinate VLAN 2200 is bound to the principal VLAN 2124. In the access switch 2, a VLAN ID of the fourth interface is set to 2124, and a VLAN 2124 of the fourth interface is configured as a principal VLAN in the MUX-VLAN; and VLAN IDs of both the first interface and the second interface are set to 2200, a VLAN 2200 is configured as a separate subordinate VLAN in the subordinate VLAN, and the separate subordinate VLAN 2200 is bound to the principal VLAN 2124. In addition, in FIG. 3, it is assumed that a subnet mask is 255.255.255.0 by default.

In this networking form, the bare-metals are separated and interconnected by using a MUX-VLAN technology and an ACL technology. In some embodiments, layer-2 traffic separation between the bare-metals is implemented by using the MUX-VLAN, and layer-3 traffic separation between the bare-metals, layer-3 traffic separation between the bare-metal and a computing node, and an interconnection between the bare-metal and the storage device are implemented by setting an ACL rule. In some embodiments:

(1) Separation of bare-metals connected to a same access switch: The bare-metals connected to the same access switch use a same VLAN and a same subnet. As shown in FIG. 3, the bare-metal 1 and the bare-metal 2 are located in a same subnet, and the bare-metal 3 and the bare-metal 4 are located in a same subnet. An interface of the access switch connected to the bare-metal is set to use the separate subordinate VLAN in the MUX-VLAN, to separate an interconnection between the bare-metals connected to the same access switch, and implement layer-2 traffic separation. It can be learned from FIG. 3 that, in the access switch 1, the first interface connected to the bare-metal 1 and the second interface connected to the bare-metal 2 are both added to the separate subordinate VLAN 2200, so that the bare-metal 1 and the bare-metal 2 are not interconnected with each other. Similarly, in the access switch 2, both the bare-metal 3 and the bare-metal 4 correspond to the separate subordinate VLAN 2200, so that the bare-metal 3 and the bare-metal 4 are not interconnected with each other.

(2) Separation between bare-metals connected to different access switches: The bare-metals connected to different access switches may use a same VLAN (including the principle VLAN and the subordinate VLAN), but need to use different subnets. Bare-metals in different subnets are separated by setting an ACL rule on the core switch. The bare-metal 1 connected to the access switch 1 and the bare-metal 3 connected to the access switch 2 in FIG. 3 are used as examples. Interfaces of the access switches corresponding to the bare-metal 1 and the bare-metal 3 use a same VLAN, but the bare-metal 1 and the bare-metal 3 use different subnets. To prevent an interconnection between the bare-metal 1 and the bare-metal 3, an ACL rule needs to be set on the core switch for layer-3 traffic separation. In some embodiments, an ACL rule is established to prohibit a subnet in which the bare-metal 1 is located from accessing a subnet in which the bare-metal 3 is located, and an ACL rule is established to prohibit the subnet in which the bare-metal 3 is located from accessing the subnet in which the bare-metal 1 is located, so that the bare-metal 1 and the bare-metal 3 are not interconnected with each other. Because the bare-metal 1 and the bare-metal 2 are located in the same subnet, and the bare-metal 3 and the bare-metal 4 are located in the same subnet, ACL rules are set with reference to the foregoing operations to prevent interconnections between the bare-metal 1 and the bare-metal 4, between the bare-metal 2 and the bare-metal 3, and between the bare-metal 2 and the bare-metal 4. For example, the ACL rule that is set on the core switch may be "rule 1 deny IP source 88.98.100.0 0.0.0.255 destination 88.98.104.0 0.0.0.255", so that any two of the bare-metal 1, the bare-metal 2, the bare-metal 3, and the bare-metal 4 cannot be interconnected with each other. In some possible embodiments, when an IP address of the bare-metal 1 and an IP address of the bare-metal 3 are known, an ACL rule for prohibiting mutual access between the IP address of the bare-metal 1 and the IP address of the bare-metal 3 may also be established on the core switch, to implement layer-3 traffic separation between the bare-metal 1 and the bare-metal 3.

(3) An interconnection between the bare-metal and the storage device: The bare-metal and the storage device use different VLANs and different subnets, and the bare-metal and the storage device may be interconnected by setting an ACL rule on the core switch. For example, if a VLAN ID of the storage device is 2126 and is different from the VLAN ID 2200 of the bare-metal 1, the bare-metal 2, the bare-metal 3, and the bare-metal 4, a subnet corresponding to the storage device is 88.98.103.0, subnets corresponding to the bare-metal 1 and the bare-metal 2 are 88.98.100.0, and subnets corresponding to the bare-metal 3 and the bare-metal 4 are 88.98.104.0. In other words, a network segment used by the storage device is 103, and is different from a network segment 100 used by the bare-metal 1 and the bare-metal 2, and is also different from a network segment 104 used by the bare-metal 3 and the bare-metal 4. The interconnection between the bare-metal 1 and the storage device is used as an example below. The bare-metal 1 and the storage device are located in different subnets, and an ACL rule may be set on the core switch to permit the interconnection between the subnet of the bare-metal 1 and the subnet of the storage device. For example, the ACL rule is "rule 2 permit 88.98.100.0 0.0.0.255 destination 88.98.103.0 0.0.0.255". In this way, the bare-metal 1 and the storage device can be interconnected with each other. Because the bare-metal 2 and the bare-metal 1 are located in the same subnet, the ACL rule can also be used to implement an interconnection between the bare-metal 2 and the storage device. ACL rules may be set with reference to the foregoing operations to implement interconnections between the bare-metal 3 and the storage device and between the bare-metal 4 and the storage device. Details are not described herein again.

It should be noted that, in the networking shown in FIG. 3, no gateway is disposed on a switch that uses the MUX-VLAN, and the gateway is disposed on the core switch.

After the foregoing setting, with reference to the MUX-VLAN and the ACL rule, finally, the bare-metal 1 and the bare-metal 2 are not interconnected with each other, the bare-metal 3 and the bare-metal 4 are not interconnected with each other, the storage device is separately interconnected with the bare-metal 1, the bare-metal 2, the bare-metal 3, and the bare-metal 4, the bare-metal 1 is separately not interconnected with the bare-metal 3 or the bare-metal 4, and the bare-metal 2 is separately not interconnected with the bare-metal 3 or the bare-metal 4.

In some possible embodiments, the networking shown in FIG. 3 further includes a computing node, such as a virtual machine 1, a virtual machine 2, a virtual machine 3, and a virtual machine 4. When the networking further includes the virtual machine, in addition to implementing separation between the bare-metals and the interconnection between the bare-metal and the storage device, the bare-metal and the virtual machine need to be controlled not to be interconnected with each other. The virtual machine 1 and the virtual machine 2 are respectively connected to a fourth interface and a fifth interface of the access switch 1, and VLAN IDs of the fourth interface and the fifth interface of the access switch 1 are set to 2125. The virtual machine 3 and the virtual machine 4 are respectively connected to a third interface and a fifth interface of the access switch 2, and VLAN IDs of the third interface and the fifth interface of the access switch 2 are set to 2125. In this case, the virtual machine needs to use different VLANs and different subnets from the bare-metal and the storage device. It can be learned from FIG. 3 that the virtual machine, the bare-metal, and the storage device use different VLANs. The virtual machines 1 and 2 are in a same subnet, but the subnet is different from the subnet of the bare-metal and the subnet of the storage device. The virtual machines 3 and 4 are in a same subnet, but the subnet is different from the subnet of the virtual machines 1 and 2, the subnet of the bare-metal, and the subnet of the storage device. Because the bare-metal and the virtual machine are located in different VLANs and different subnets, a corresponding ACL rule may be set on the core switch to separate the bare-metal and the virtual machine. In this way, the bare-metal 1 and the bare-metal 2 are separately not interconnected with any one of the virtual machine 1, the virtual machine 2, the virtual machine 3, and the virtual machine 4, and the bare-metal 3 and the bare-metal 4 are separately not interconnected with any one of the virtual machine 1, the virtual machine 2, the virtual machine 3, and the virtual machine 4. Whether the virtual machines communicate with each other and whether the virtual machine and the storage device communicate with each other are not limited in this application.

It should be noted that, during setting of the separation and the interconnection between the bare-metals in this networking form, same or a small quantity of VLAN IDs need to be used as far as possible when the MUX-VLAN technology is used. A same principal VLAN can be bound to only one separate subordinate VLAN. Therefore, the bare-metals 1 and 2 and the bare-metals 3 and 4 correspond to a same VLAN ID.

Figure 4:
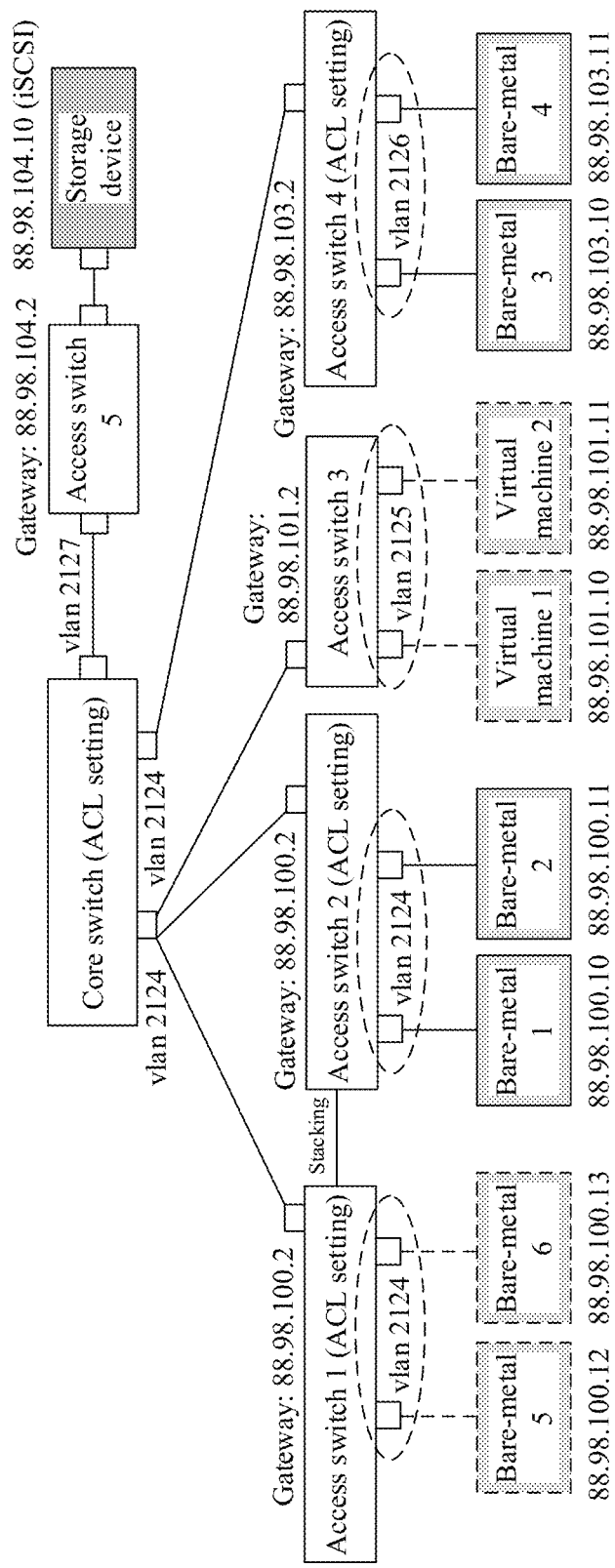
FIG. 4 is a schematic diagram of another type of networking of bare-metals according to an embodiment of this application.

FIG. 4 is a schematic diagram of another type of networking of bare-metals according to an embodiment of this application. As shown in FIG. 4, this scenario includes a plurality of bare-metals, a plurality of access switches, a core switch, and a storage device. The storage device is connected to the core switch by using an access switch 5, a bare-metal 1 and a bare-metal 2 are connected to the core switch by using an access switch 2, and a bare-metal 3 and a bare-metal 4 are connected to the core switch by using an access switch 4. In some possible embodiments, the networking shown in FIG. 4 further includes a computing node, such as a virtual machine 1 and a virtual machine 2, and the virtual machine 1 and the virtual machine 2 are connected to the core switch by using an access switch 3. It can be seen that the virtual machine and the bare-metal do not share an access switch. It should be noted that the bare-metals, the storage device, and the virtual machines use different subnets. In addition, in FIG. 4, it is assumed that a subnet mask is 255.255.255.0 by default.

In this networking form, the bare-metals are separated and interconnected only by using an ACL technology. In some embodiments, ACL rules are set to implement layer-2 traffic separation and layer-3 traffic separation between the bare-metals, layer-3 traffic separation between the bare-metal and the computing node, and communication between the bare-metal and the storage device. In some embodiments:

(1) Separation between bare-metals connected to a same access switch: The bare-metals connected to the same access switch use a same subnet, and an ACL rule is set on the access switch to prevent an interconnection between the bare-metals connected to the same access switch, to implement layer-2 traffic separation. For example, the bare-metal 3 and the bare-metal 4 in FIG. 4 are used as an example. An ACL rule is set on the access switch 4 to prohibit a subnet in which the bare-metal 3 is located and a subnet in which the bare-metal 4 is located from accessing each other, for example, "rule 1 deny IP source 88.98.103.0 0.0.0.255 destination 88.98.103.0 0.0.0.255". In addition, an ACL rule may be set with reference to the foregoing operations to prevent an interconnection between the bare-metal 1 and the bare-metal 2 that are connected to the access switch 2 in FIG. 4. Details are not described herein again. For layer-2 traffic separation between the bare-metals connected to the same access switch, refer to the foregoing operations.

(2) Separation between bare-metals connected to different access switches: The bare-metals connected to different access switches are in different subnets. An ACL rule is set on the core switch corresponding to the bare-metals to separate the bare-metals in the subnets, that is, layer-3 traffic separation is implemented. The bare-metal 1 connected to the access switch 2 and the bare-metal 3 connected to the access switch 4 in FIG. 4 are used as examples. Interfaces of the access switches corresponding to the bare-metal 1 and the bare-metal 3 use different VLANs, and the bare-metal 1 and the bare-metal 3 use different subnets. If an interconnection between the bare-metal 1 and the bare-metal 3 is to be prevented, ACL rules such as "rule 1 deny IP source 88.98.100.0 0.0.0.255 destination 88.98.103.0 0.0.0.255" (this ACL rule can prohibit the bare-metal 1 from accessing the bare-metal 3) and "rule 2 deny IP source 88.98.103.0 0.0.0.255 destination 88.98.100.0 0.0.0.255" (this ACL rule can prohibit the bare-metal 3 from accessing the bare-metal 1) are set on the core switch to prohibit a subnet in which the bare-metal 1 is located and a subnet in which the bare-metal 3 is located from accessing each other. In this way, the bare-metal 1 and the bare-metal 3 are not interconnected with each other. Because the bare-metal 1 and the bare-metal 2 are located in a same subnet, and the bare-metal 3 and the bare-metal 4 are located in a same subnet, the two ACL rules that are set above can also prevent an interconnection between the bare-metal 1 and the bare-metal 4 and interconnections between the bare-metal 2 and the bare-metal 3 and between the bare-metal 2 and the bare-metal 4 in FIG. 4. For separation between bare-metals connected to different access switches, refer to the foregoing operations.

(3) An interconnection between the bare-metal and the storage device: The bare-metal and the storage device use different VLANs and different subnets, and the bare-metal and the storage device may be interconnected by setting an ACL rule on the core switch. An interconnection between the bare-metal 3 and the storage device shown in FIG. 4 is used as an example. The bare-metal 3 and the storage device are configured with different VLANs and different subnets. A gateway of the access switch 4 and a gateway of the access switch 5 are configured, and ACL rules such as "rule 3 permit IP source 88.98.103.0 0.0.0.255 destination 88.98.104.0 0.0.0.255" and "rule 4 permit IP source 88.98.104.0 0.0.0.255 destination 88.98.103.0 0.0.0.255" that permit the bare-metal 3 and the storage device to access each other are set on the core switch. In this way, the bare-metal 3 and the storage device can be interconnected with each other. Because the bare-metal 3 and the bare-metal 4 are located in the same subnet, the rule 3 and the rule 4 that are set above can further implement an interconnection between the bare-metal 4 and the storage device. ACL rules may be set with reference to the foregoing operations to implement interconnections between the bare-metal 1 and the storage device and between the bare-metal 2 and the storage device. Details are not described herein again.

In some possible embodiments, a networking environment shown in FIG. 4 further includes a computing node, such as a virtual machine 1 and a virtual machine 2. In addition to separation between the bare-metals, separation between the bare-metal and the virtual machine further needs to be implemented. The bare-metal and the virtual machine use different subnets. Therefore, ACL rules need to be set on the core switch to prohibit the bare-metal and the virtual machine from accessing each other, to prevent an interconnection between the bare-metal and the virtual machine. In this way, layer-3 traffic separation between the bare-metal and the virtual machine is implemented.

In some possible embodiments, the bare-metal and the virtual machine may alternatively share an access switch. If the bare-metal and the virtual machine use a same VLAN and a same subnet, for a same access switch, ACL rules need to be set on the access switch to control layer-2 traffic separation between the bare-metals and layer-2 traffic separation between the bare-metal and the virtual machine. If the bare-metal and the virtual machine use different VLANs and different subnets, for a same access switch, ACL rules need to be set on the access switch to control layer-2 traffic separation between the bare-metals and layer-3 traffic separation between the bare-metal and the virtual machine. For separation between bare-metals connected to different access switches and separation between the bare-metal and the virtual machine, refer to the foregoing related descriptions to perform setting on the core switch. This is not limited in this application.

It should be noted that, in the networking shown in FIG. 4, a gateway needs to be configured for each access switch.

In some possible embodiments, the access switches may be stacked to provide as many interfaces as possible in limited space. As shown in FIG. 4, if the access switch 1 and the access switch 2 are stacked, a configuration of the access switch 1 is the same as a configuration of the access switch 2. In other words, a VLAN ID of the access switch 1 and a VLAN ID of the access switch 1 are the same, and both are 2124, and a gateway of the access switch 1 and a gateway of the access switch 2, and both are 88.98.100.2. In addition, the access switch 1 is connected to a bare-metal 5 and a bare-metal 6, and the bare-metals 5 and 6 are located in a same subnet as the bare-metals 1 and 2 connected to the access switch 2. In this case, to separate any two of the bare-metals 1 and 2 and the bare-metals 5 and 6, ACL rules are set on the access switch 2 to prohibit an interconnection between the bare-metal 1 and the bare-metal 2, and ACL rules further need to be set on the access switch 2 to prohibit interconnections between the bare-metal 1 and the bare-metal 5 and between the bare-metal 1 and the bare-metal 6 and prohibit interconnections between the bare-metal 2 and the bare-metal 5 and between the bare-metal 2 and the bare-metal 6. Similarly, ACL rules need to be set on the access switch 1 to prohibit an interconnection between the bare-metal 5 and the bare-metal 6, an interconnection between the bare-metal 5 and the bare-metal 1, and an interconnection between the bare-metal 6 and the bare-metal 5. Because the bare-metal 1, the bare-metal 2, the bare-metal 5, and the bare-metal 6 are located in a same VLAN and a same subnet, an ACL rule such as "rule 1 deny IP source 88.98.100.0 0.0.0.255 destination 88.98.100.0 0.0.0.255" is set on the access switch 2 to prohibit bare-metals in a same network segment from accessing each other, so that any two of the bare-metal 1, the bare-metal 2, the bare-metal 3, and the bare-metal 4 can be separated. Similarly, an ACL rule is also set on the access switch 1 to separate any two of the bare-metal 1, the bare-metal 2, the bare-metal 3, and the bare-metal 4. In addition, for implementation of separation between the bare-metal 5 and the bare-metal 3 and between the bare-metal 6 and the bare-metal 4, refer to the foregoing rules to perform corresponding setting on the access switch 1 and the access switch 2. Details are not described herein again.

Through comparison, there may be the following two differences between FIG. 3 and FIG. 4: 1. Bare-metals that are in a same VLAN and a same subnet and that are connected to a same access switch are separated. In FIG. 3, layer-2 traffic separation between the bare-metals is implemented on the access switch over a separate VLAN in a MUX-VLAN. In FIG. 4, an ACL rule is set on the access switch to prohibit an interconnection between the bare-metals, so that layer-2 traffic separation between bare-metals is implemented. 2. In FIG. 3, the bare-metal and the virtual machine share an access switch, but in FIG. 4, the bare-metal and the virtual machine do not share an access switch. In a large-scale networking environment, the networking manner in FIG. 4 can reduce impact of an accident on a global case, and is more secure.

It should be noted that, in FIG. 3 and FIG. 4, a correspondence between each bare-metal and a tenant is not limited in this application, but the bare-metals cannot be interconnected with each other. In other words, in FIG. 3 and FIG. 4, the bare-metal may be in a one-to-one relationship with the tenant, or the bare-metal may be in a one-to-many relationship with the tenant. However, regardless of whether the bare-metals correspond to a same tenant or different tenants, the bare-metals cannot be interconnected with each other, and the bare-metals can be interconnected only with the storage device.

Figure 5:
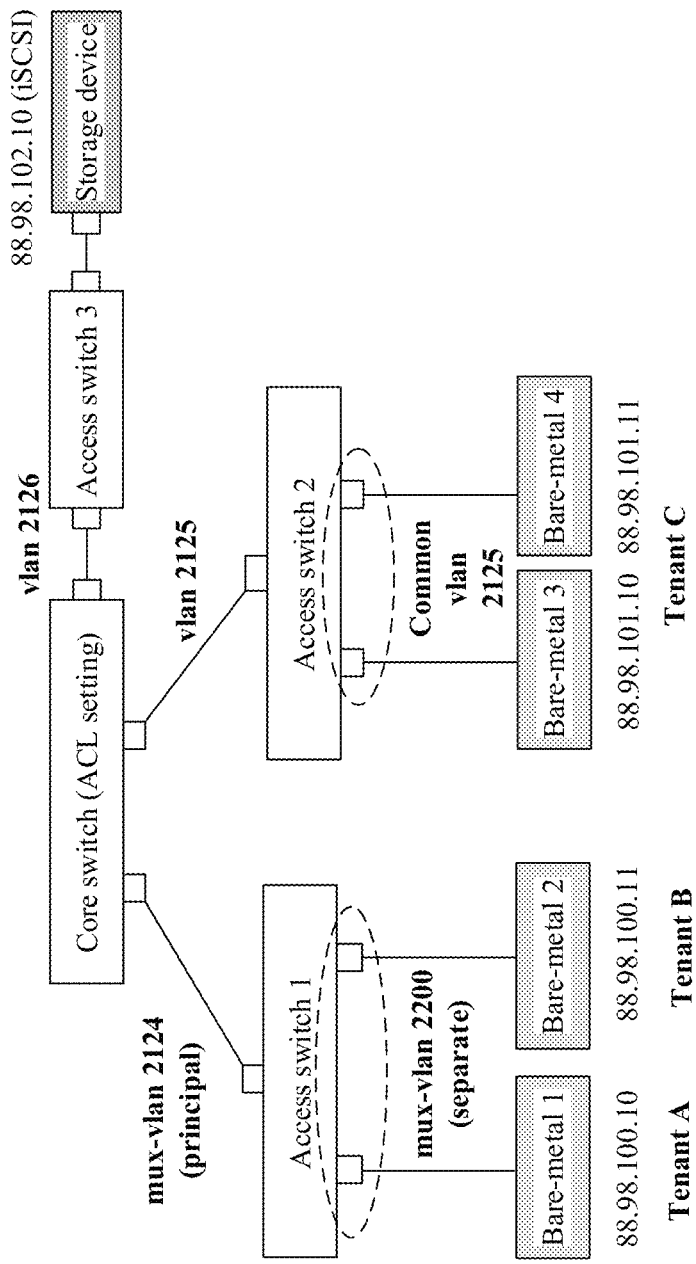
FIG. 5 is a schematic diagram of another type of networking of bare-metals according to an embodiment of this application.

In addition to the networking manners shown in FIG. 3 and FIG. 4, as shown in FIG. 5, this application provides another networking manner of bare-metals. In FIG. 5, a correspondence between a tenant and a bare-metal is introduced. When a requirement for secure separation between bare-metals in the networking is not high, separation between bare-metals may be separation between bare-metals of different tenants, bare-metals of a same tenant may be interconnected with each other, the bare-metal is separated from a computing node, and the bare-metal is interconnected with a storage device. The networking manner shown in FIG. 5 may be independent of FIG. 3 and FIG. 4, or may be a supplement to FIG. 3 and FIG. 5. This is not limited in this application.

In FIG. 5, the storage device and the bare-metal use different VLANs and different subnets. The storage device is connected to a core switch by using an access switch 3, a bare-metal 1 and a bare-metal 2 are connected to the core switch by using an access switch 1, and a bare-metal 3 and a bare-metal 4 are connected to the core switch by using an access switch 2. The bare-metal 1 corresponds to a tenant A, and the bare-metal 2 corresponds to a tenant B. In other words, the bare-metal 1 and the bare-metal 2 correspond to different tenants. Both the bare-metal 3 and the bare-metal 4 correspond to a tenant C.

Because the bare-metal 1 and the bare-metal 2 use a same VLAN and a same subnet, a separate subordinate VLAN in a MUX-VLAN is used on the access switch 1 to implement layer-2 traffic separation between the bare-metal 1 and the bare-metal 2. The bare-metal 3 and the bare-metal 4 use a same VLAN and a same subnet, and the bare-metal 3 and the bare-metal 4 corresponding to a same tenant can be interconnected with each other. In addition, the bare-metals 1 and 2 and the bare-metals 3 and 4 use different VLANs and different subnets. On the core switch, ACL rules are set to prohibit interconnections between the bare-metal 1 and the bare-metal 3 and between the bare-metal 1 and the bare-metal 4, and ACL rules are set to prohibit interconnections between the bare-metal 2 and the bare-metal 3 and between the bare-metal 2 and the bare-metal 4, to implement separation between bare-metals corresponding to different tenants. For an interconnection between the bare-metal and the storage device, ACL rules may be set on the core switch to permit mutual access between the bare-metal and the storage device.

In some possible embodiments, if there is a computing node in the networking shown in FIG. 5, the computing node and the bare-metal use different subnets. In this case, separation between the bare-metal and the computing node further needs to be controlled. In other words, an ACL rule is set on the core switch to prohibit an interconnection between each bare-metal and the computing node, to implement layer-3 traffic separation.

Figure 6:
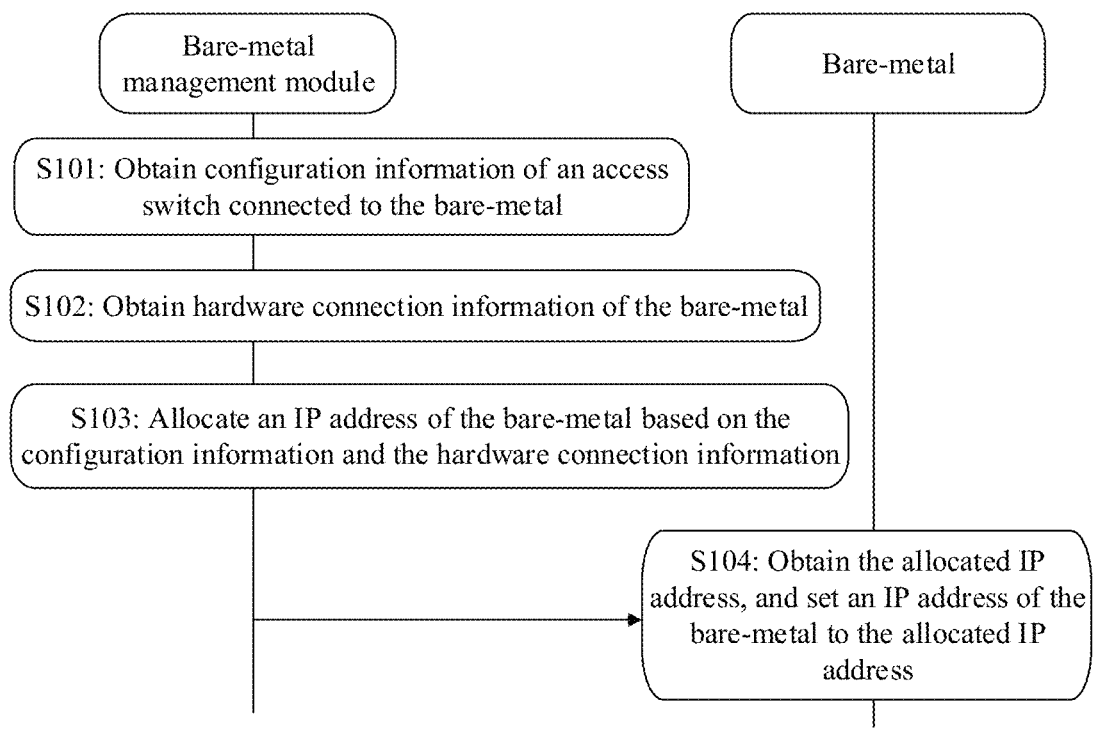
FIG. 6 is a flowchart of a method for automatically configuring an IP address of a bare-metal according to an embodiment of this application.

The foregoing networking method is used to control separation between bare-metals in a networking form and an interconnection between the bare-metal and the storage device. In this way, configuration information of each switch in the networking form in which the bare-metal is located is obtained. In addition, an IP address of the bare-metal further needs to be configured to achieve the foregoing objective (2). An embodiment of this application provides a method for automatically configuring an IP address of a bare-metal, to replace manual configuration of the IP of the bare-metal, so that accuracy and efficiency of configuring the IP of the bare-metal are improved. FIG. 6 shows a method for automatically configuring an IP address of a bare-metal according to an embodiment of this application. The method includes but is not limited to the following operations.

S101: A bare-metal management module obtains configuration information of an access switch connected to a bare-metal.

In this embodiment of this application, the bare-metal management module obtains the configuration information of the access switch connected to the bare-metal. The configuration information includes an identifier (or a name, a number, or the like) of the access switch, a subnet of the access switch, and a mapping relationship between the identifier of the access switch and the subnet of the access switch. In some possible embodiments, the configuration information further includes information such as a VLAN ID of each interface of the access switch, a VLAN attribute (that is, a principal VLAN, a separate subordinate VLAN, a common VLAN, and the like) of the access switch, and a subnet mask. In some possible embodiments, if an ACL is set on the access switch to perform layer-2 traffic separation between bare-metals, the configuration information further includes a gateway of the access switch.

In some embodiments, a network administrator pre-configures, on a cloud management platform, an access switch, a core switch, and a storage device in an established storage network based on at least one of the networking methods described in FIG. 3 and FIG. 4, and stores configuration information of the access switch, the core switch, and the storage device. When the bare-metal management module needs to automatically configure an IP address of each bare-metal, the bare-metal management module obtains, from the cloud management platform, configuration information of an access switch connected to the bare-metal.

S102: The bare-metal management module obtains hardware connection information of the bare-metal.

The hardware connection information indicates a status of a connection between the bare-metal and the access switch, and the hardware connection information includes a MAC address of a storage network interface card of the bare-metal, an identifier (or a name, a number, or the like) of the access switch, and a connection mapping relationship between the MAC address of the storage network interface card of the bare-metal and the identifier of the access switch.

In this embodiment of this application, after the bare-metal installs an operating system based on customization of a tenant, and the bare-metal, the access switch, and the like are powered on, the bare-metal management module delivers a node information update command to the bare-metal; after receiving the command, the bare-metal sends link layer discovery protocol (LLDP) information of the bare-metal to the bare-metal management module; and the bare-metal management module obtains the hardware connection information of the bare-metal from the LLDP information of the bare-metal.

S103: The bare-metal management module allocates an IP address of the bare-metal based on the configuration information and the hardware connection information.

In this embodiment of this application, the bare-metal management module determines, based on the hardware connection information, the bare-metal and an identifier of a target access switch connected to the bare-metal, and searches the configuration information for a subnet corresponding to the identifier of the target access switch, to determine a network ID of a subnet in which the bare-metal is located. Further, the bare-metal management module determines a MAC address of a storage network interface card of the bare-metal based on the hardware connection information, and allocates a host ID to the bare-metal based on the MAC address. In this way, the network ID and the host ID of the bare-metal are determined. The network ID and the host ID form an IP address of the bare-metal. Therefore, the bare-metal management module completes allocation of the IP address of the bare-metal.

When there are a plurality of bare-metals, the bare-metal management module may allocate a host ID to each bare-metal in a corresponding subnet based on a sequence of reading MAC addresses of storage network interface cards of the plurality of bare-metals, to avoid repeated IP address allocation for the bare-metal.

In some possible embodiments, the bare-metal management module may further determine the bare-metal, the target access switch connected to the bare-metal, and a target interface based on the hardware connection information, search the configuration information for a VLAN ID corresponding to the target interface of the target access switch and a corresponding subnet to determine the network ID of the subnet in which the bare-metal is located, and then allocate a host ID to each bare-metal based on a sequence of reading MAC addresses of storage network interface cards of the bare-metals from the hardware connection information.

For example, it is assumed that the hardware connection information shows that a bare-metal 1 and a bare-metal 2 are separately connected to an access switch 1. If the bare-metal management module is to allocate IP addresses to the bare-metal 1 and the bare-metal 2, the bare-metal management module searches the configuration information for a VLAN 2124 corresponding to the access switch 1 and a subnet 88.98.100.0 in which the access switch 1 is located. Therefore, the bare-metal management module may determine to allocate IP addresses to the bare-metal 1 and the bare-metal 2 in the subnet 88.98.100.0. Further, in the hardware connection information, host IDs are sequentially allocated to the bare-metal 1 and the bare-metal 2 based on a sequence of reading a MAC address of the bare-metal 1 and a MAC address of the bare-metal 2, to prevent repeated allocation of host IDs. Finally, an IP address allocated to the bare-metal 1 is 88.98.100.10, and an IP address allocated to the bare-metal 2 is 88.98.100.11.

It should be noted that, after the IP address of the bare-metal is allocated, the bare-metal management module stores the IP address of the bare-metal and the MAC address of the storage network interface card of the bare-metal in metadata.

It should be noted that if VLANs are classified based on switch interfaces, the subnet in which the bare-metal is located may be determined based on the interface of the target switch connected to the bare-metal. In some possible embodiments, if VLANs are classified based on MAC addresses, the hardware connection information obtained by the storage device includes a mapping relationship between a bare-metal and a MAC address of a switch connected to the bare-metal, and the subnet in which the bare-metal is located may be determined based on the MAC address of the switch corresponding to the bare-metal.

S104: The bare-metal obtains the allocated IP address from the bare-metal management module, and sets the IP address of the bare-metal to the allocated IP address.

In this embodiment of this application, the bare-metal obtains the allocated IP address from the bare-metal management module, and sets the IP address of the bare-metal to the allocated IP address. In some embodiments, the bare-metal receives a start command of the tenant, and a storage agent module in the bare-metal automatically starts. The storage agent module obtains the allocated IP address from the metadata of the bare-metal management module, and the allocated IP address corresponds to the MAC address of the storage network interface card of the bare-metal. The storage agent module uses the allocated IP address as the IP address of the bare-metal. In this way, the IP address of the bare-metal is automatically allocated.

In some possible embodiments, the IP address may be automatically allocated to the bare-metal by using a dynamic host configuration protocol (DHCP). This is not limited in this application.

It can be learned that, in this embodiment of this application, the IP address is automatically configured for the bare-metal based on networking configuration information of the bare-metal and the hardware connection information of the bare-metal, so that accuracy and efficiency of configuring the IP address of the bare-metal are improved, and security of connecting the bare-metal to the storage device is improved.

Figure 7:
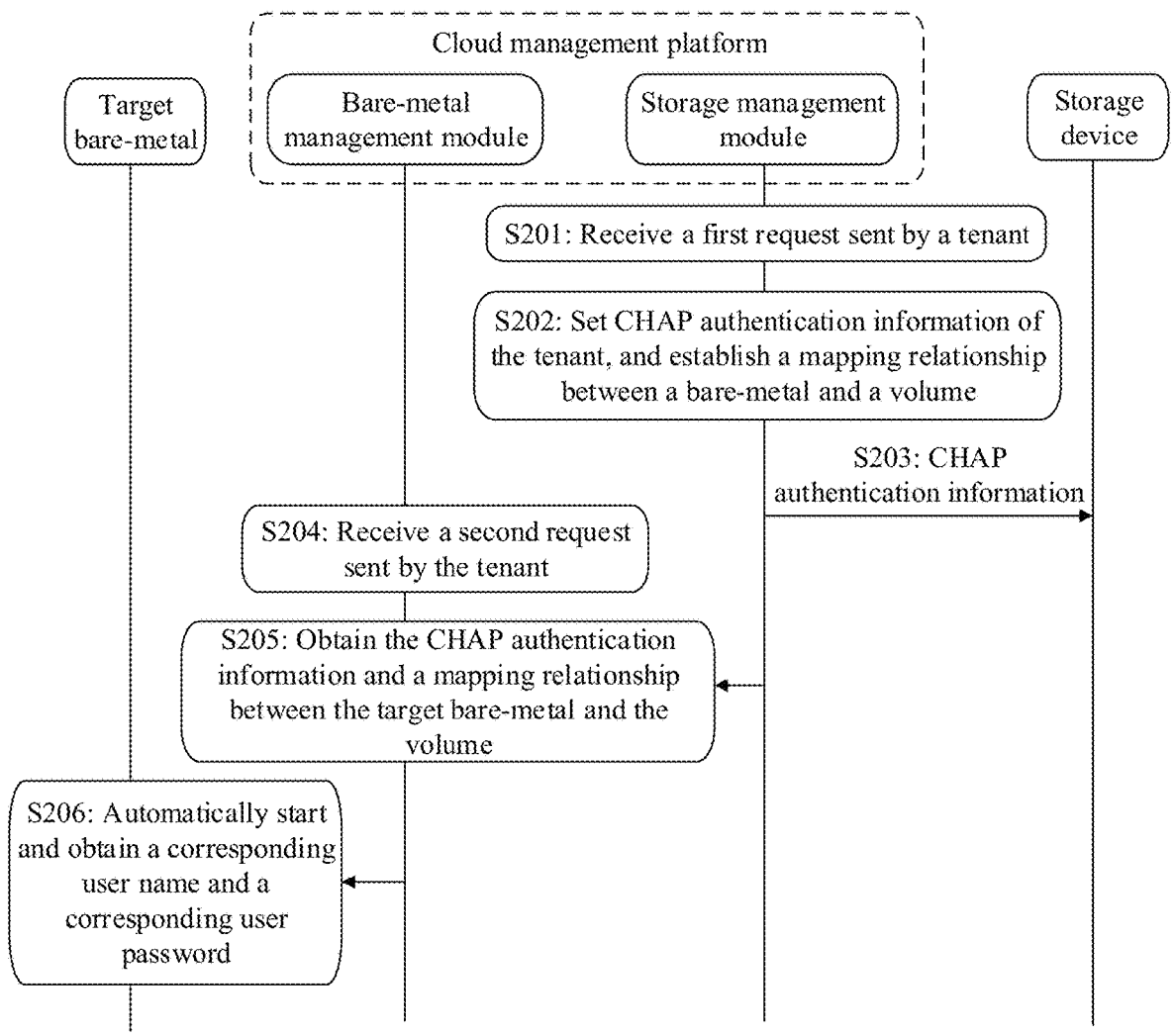
FIG. 7 is a flowchart of a method for configuring CHAP authentication information of a bare-metal according to an embodiment of this application.

After networking configuration for the bare-metal and automatic configuration of the IP address of the bare-metal are completed, the bare-metal may communicate with the storage device. To further improve security of communication between the bare-metal and the storage device, when the bare-metal sends a read operation command or a write operation command to the storage device, CHAP authentication needs to be performed on the bare-metal and the storage device, that is, the foregoing objective (3) is implemented. Before CHA authentication, a user name and a user password used by the bare-metal for the CHAP authentication need to be configured first. FIG. 7 is a flowchart of a method for configuring a user name and a user password for CHAP authentication according to an embodiment of this application. The method includes but is not limited to the following operations.

S201: A storage management module receives a first request sent by a tenant.

In this embodiment of this application, the storage management module on a cloud management platform receives the first request sent by the tenant. The first request includes tenant information, a size of a volume, and a number of a target bare-metal, and the first request is used to indicate the storage management module to create a volume for the target bare-metal leased by the tenant.

S202: The storage management module sets CHAP authentication information of the tenant, and establishes a mapping relationship between the target bare-metal and the volume.

In this embodiment of this application, after receiving the first request sent by the tenant, the storage management module on the cloud management platform sets the CHAP authentication information corresponding to the tenant. The CHAP authentication information includes at least one group of user names and user passwords, and the user name and the user password are used for CHAP authentication between the target bare-metal leased by the tenant and storage setting. In addition, the storage device allocates a corresponding volume to the target bare-metal based on the size of the volume in the first request, and establishes the mapping relationship between the target bare-metal and the volume. Each volume has a unique logical unit number LUN.

It should be noted that, when there is one target bare-metal in the first request, the CHAP authentication information includes only one group of user names and user passwords, and when there are a plurality of target bare-metals in the first request, the CHAP authentication information includes a plurality of groups of user names and user passwords, that is, the storage management module creates a plurality of groups of user names and user passwords for the tenant; in other words, each target bare-metal corresponds to one group of user names and user passwords, and different target bare-metals correspond to different user names and different user passwords. In other words, the storage management module uses the target bare-metal as a basis for creating the user name and the user password, to improve security of connecting the target bare-metal to the storage device.

In some possible embodiments, when there are a plurality of target bare-metals in the first request, the storage management module may alternatively create only one group of user names and user passwords for the tenant. In other words, a plurality of target bare-metals leased by the tenant share the group of user names and user passwords. This is not limited in this application.

S203: The storage management module sends the CHAP authentication information to the storage device.

In this embodiment of this application, the storage management module sends the user name and the user password used for CHAP authentication to the storage device. Correspondingly, the storage device receives the user name and the user password that are used for the CHAP authentication and that are sent by the storage management module.

S204: A bare-metal management module receives a second request sent by the tenant.

In this embodiment of this application, the bare-metal management module receives the second request sent by the tenant. The second request includes a number of the target bare-metal, and the second request is used to indicate the bare-metal management module to mount a volume on the target bare-metal.

S205: The bare-metal management module obtains the CHAP authentication information of the tenant and the mapping relationship between the target bare-metal and the volume from the storage management module.

In this embodiment of this application, after receiving the second request, the bare-metal management module obtains the CHAP authentication information of the tenant and the mapping relationship between the target bare-metal and the volume from the storage management module, and mounts the volume on the target bare-metal based on the mapping relationship between the target bare-metal and the volume.

In addition, the bare-metal management module sends metadata of the volume corresponding to the target bare-metal to the target bare-metal. Correspondingly, the storage agent module in the target bare-metal receives the metadata of the volume.

It should be noted that both the CHAP authentication information sent by the storage management module to the storage device in S203 and the CHAP authentication information obtained by the bare-metal management module in S204 are encrypted. An encryption algorithm such as a symmetric encryption algorithm (such as a DES algorithm) or an asymmetric encryption algorithm (such as an RSA algorithm) or a hash algorithm such as an MD5 algorithm may be used in an encryption processing process. This is not limited in this application.

S206: The target bare-metal automatically starts, and the target bare-metal obtains a corresponding user name and a corresponding user password from the bare-metal management module.

In this embodiment of this application, the target bare-metal receives a start command sent by the tenant and automatically starts, and the storage agent module in the target bare-metal obtains the user name and the user password of the target bare-metal from the bare-metal management module.

It should be noted that, if the user name and the user password obtained by the target bare-metal are encrypted, correspondingly, the target bare-metal further needs to decrypt the obtained user name and the obtained user password, and send the decrypted user name and the decrypted user password to an iSCSI initiator in the target bare-metal, so that the iSCSI initiator in the bare-metal performs CHAP authentication with the storage device based on the user name and the user password when the target bare-metal sends a read/write operation command to the storage device. If the CHAP authentication on the target bare-metal succeeds, the target bare-metal may use a corresponding volume in the storage device based on metadata of the volume. For a CHAP authentication process, refer to the following related descriptions. For brevity of the specification, details are not described herein again.

In some possible embodiments, if the tenant is to change the user name and the user password corresponding to the bare-metal, the tenant sends a third request to the storage management module. The third request includes an identifier of the target bare-metal, and the third request is used to indicate the storage management module to change the user name and the user password corresponding to the target bare-metal in the CHAP authentication information. The storage management module resends the changed CHAP authentication information to the storage device and the bare-metal management module. The tenant restarts the target bare-metal. After the target bare-metal automatically starts, the target bare-metal obtains the corresponding changed user name and user password from the bare-metal management module. In this way, the user name and the user password used for the CHAP authentication of the bare-metal are updated.

It can be learned that, in this embodiment of this application, before the bare-metal accesses the storage device, the user name and the user password used by the bare-metal for the CHAP authentication are configured, so that the CHAP authentication is subsequently performed between the bare-metal and the storage device, so that security of connecting the bare-metal to the storage device is improved, and the bare-metal can be connected to an iSCSI protocol-based storage device in a secure and trusted manner.

Figure 8:
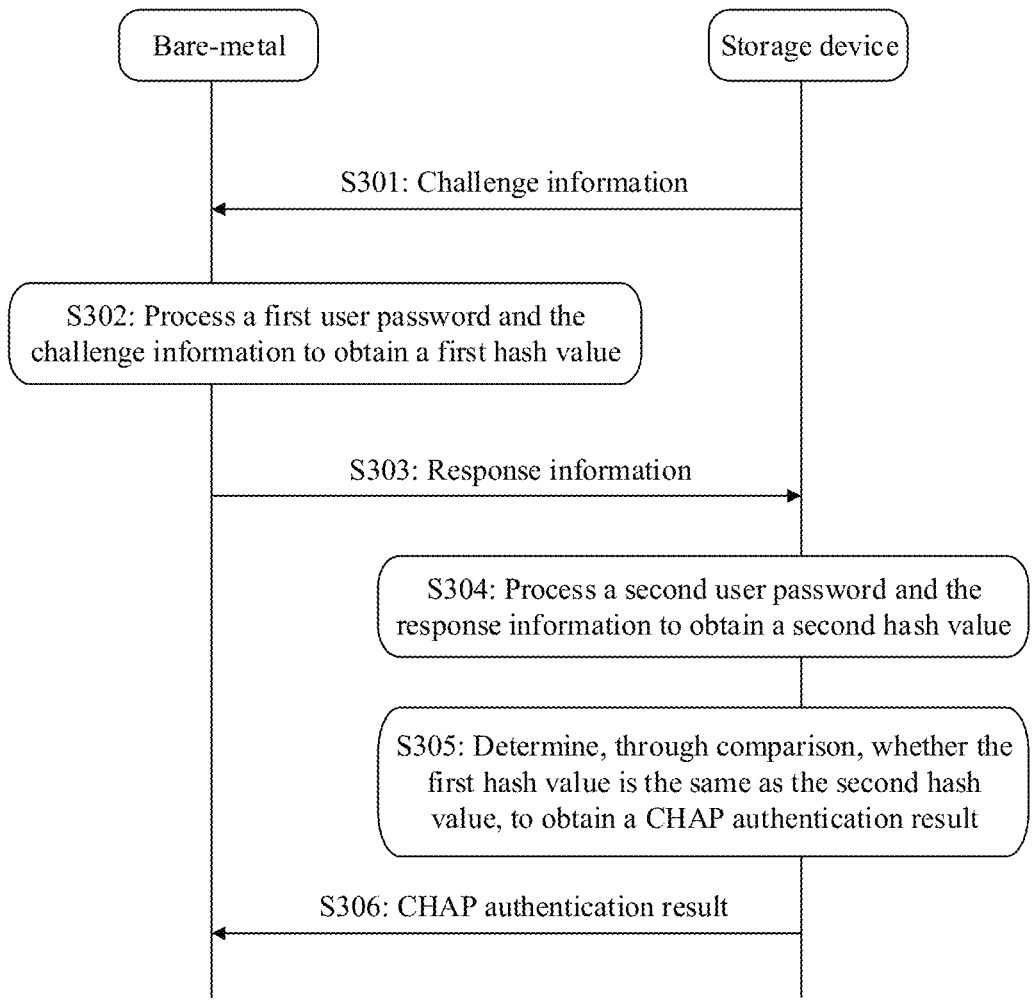
FIG. 8 is a flowchart of a method for CHAP authentication between a bare-metal and a storage device according to an embodiment of this application.

After the user name and the user password used for the CHAP authentication of the bare-metal are completed, when the bare-metal sends a read operation command or a write operation command to the storage device, the storage device initiates CHAP authentication for a bare-metal that sends an access request, to verify whether the bare-metal has an access permission. The bare-metal can perform a read operation or a write operation on the storage device only after the verification succeeds. FIG. 8 is a flowchart of a CHAP authentication method used when a bare-metal is connected to a storage device according to an embodiment of this application. The method includes but is not limited to the following operations.

S301: A storage device sends challenge information to a bare-metal.

In some embodiments, the storage device sends the challenge information to the bare-metal. The challenge information includes random data and a CHAP ID, the random data is randomly generated by the storage device, and the CHAP ID is also generated by the storage device. It should be noted that the CHAP ID corresponds to both the random data and the bare-metal. Correspondingly, the bare-metal receives the challenge information sent by the storage device.

It should be noted that message interaction between the bare-metal and the storage device in a CHAP authentication process is actually interaction between an iSCSI initiator in the bare-metal and an iSCSI target in the storage device.

S302: The bare-metal processes a first user password and the challenge information to obtain a first hash value.

In some embodiments, after receiving the challenge information sent by the storage device, the bare-metal obtains the first user password of the bare-metal from storage space, and calculates the first user password, the random data, and the CHAP ID based on a message digest algorithm version 5 (Message-Digest Algorithm 5, MD5) to obtain the first hash value. The challenge information includes the random data and the CHAP ID.

The MD5 algorithm is a widely used hash function. After an input of any length is processed by using the MD5 algorithm, a 128-bit (16-byte) hash value may be generated, the hash value may also be referred to as a hash value. Different hash values are obtained for different inputs. Therefore, the MD5 algorithm may be used to ensure entire consistency of information during transmission. For a process in which input data is processed by using the MD5 to obtain the first hash value, refer to a conventional technology. Details are not described herein again.

It should be noted that, before the storage device sends the challenge information to the bare-metal, the bare-metal obtains the first user password and a first user name from a bare-metal management module in advance, and the first user password corresponds to the first user name. During creation of the bare-metal, the bare-metal management module obtains the first user name and the first user password corresponding to the bare-metal from a storage management module of the storage device.

S303: The bare-metal sends response information to the storage device.

In some embodiments, after obtaining the first hash value, the bare-metal sends the response information to the storage device, so that the storage device verifies an identity of the bare-metal based on the response information. The response information includes the first hash value, the first user name of the bare-metal, and the CHAP ID, and the CHAP ID is sent by the storage device to the bare-metal in S1. Correspondingly, the storage device receives the response information sent by the bare-metal.

S304: The storage device processes a second user password and the response information to obtain a second hash value.

In some embodiments, after receiving the response information, the storage device searches mapping information based on the first user name in the response information to obtain the second user password corresponding to the first user name. The mapping information includes a correspondence between the first user name and the second user password, and the mapping information is stored in the storage device. The storage device further obtains, based on the CHAP ID in the response information, random data corresponding to the CHAP ID, and processes the second user password, the random data, and the CHAP ID by using the MD5 algorithm to obtain the second hash value.

S305: The storage device determines, through comparison, whether the first hash value is the same as the second hash value, to obtain a CHAP authentication result.

In some embodiments, the storage device determines, through comparison, whether the first hash value is the same as the second hash value, to obtain the CHAP authentication result. In some embodiments, if the first hash value is the same as the second hash value, the CHAP authentication result is that the authentication succeeds, that is, it indicates that the identity of the bare-metal is valid; or if the first hash value is different from the second hash value, the CHAP authentication result is that the authentication fails, that is, it indicates that the identity of the bare-metal is invalid.

S306: The storage device sends the CHAP authentication result to the bare-metal.

In some embodiments, the storage device sends the CHAP authentication result to the bare-metal, and correspondingly, the bare-metal receives the CHAP authentication result sent by the storage device. When the received CHAP authentication result indicates that the authentication succeeds, it indicates that the identity of the bare-metal is valid, the storage device has a volume mapped to the bare-metal, and the bare-metal has permission to use the volume mapped to the storage device. When the received CHAP authentication result indicates that the authentication fails, it indicates that the identity of the bare-metal is invalid, and the bare-metal has no permission to use storage space of the storage device.

It can be learned that, before the bare-metal accesses the storage device, a CHAP authentication process on the bare-metal and the storage device is added to determine whether the bare-metal has the permission to use the storage space of the storage device, so that security of a process in which the bare-metal is connected to the storage device in a multi-tenant scenario is improved, and brute-force cracking of an iSCSI initiator in the bare-metal is effectively prevented.

Figure 9:
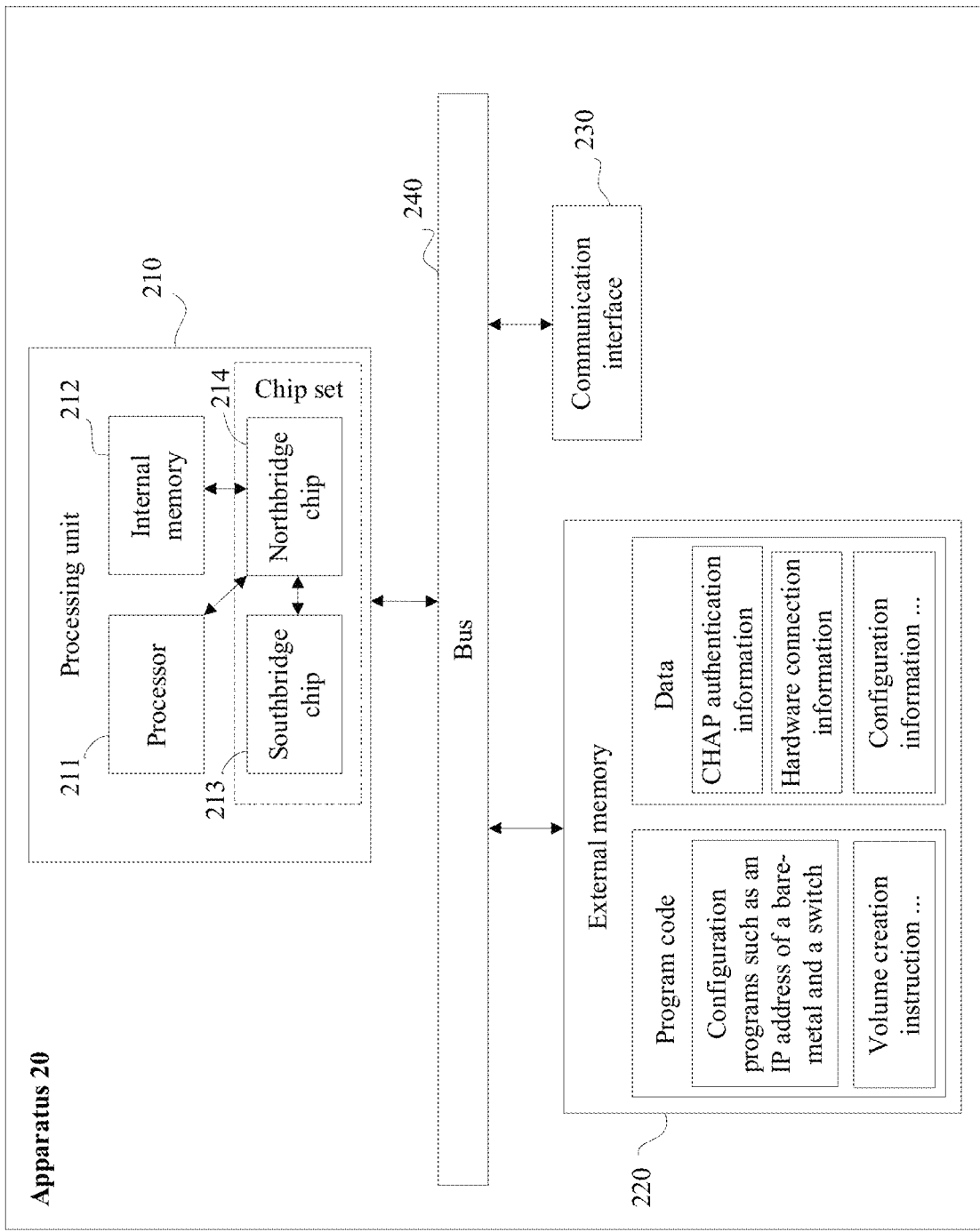
FIG. 9 is a schematic diagram of a structure of an apparatus according to an embodiment of this application.

FIG. 9 is a schematic diagram of a structure of an apparatus according to this application. An apparatus 21 includes at least one or more processing units 210, an external memory 220, a communication interface 230, and a bus 240. The processing unit 210, the external memory 220, and the communication interface 230 are connected by using the bus 240. The apparatus 21 may be the cloud management platform in FIG. 1.

The bus 240 may be a peripheral component interconnect (PCI) bus, an extended industry standard architecture (EISA) bus, or the like. The bus 240 may be classified into an address bus, a data bus, a control bus, and the like.

The communication interface 230 may be a wired interface or a wireless interface, and is configured to communicate with another module or device. The wired interface may be an Ethernet interface, a controller area network (CAN) interface, a local interconnect network (LIN) interface, or a FlexRay interface. The wireless interface may be a cellular network interface, a wireless local area network interface, or the like. In this embodiment of this application, the communication interface 230 may be separately configured to interact with a bare-metal and a storage device.

The external memory 220 may include a volatile memory, for example, a random access memory (RAM). The memory 220 may alternatively include a non-volatile memory, for example, a read-only memory (ROM), a flash memory, a hard disk drive (HDD), or a solid-state drive (SSD). The memory 220 may alternatively include a combination of the foregoing types. The external memory may be configured to store executable program code and program data. The stored code includes a bare-metal IP address configuration program, a configuration program of each switch, a storage device IP configuration program, a volume creation instruction, a volume mounting instruction, another application program, and the like. The stored data includes configuration data of each switch, allocation information of an IP address of a bare-metal, hardware connection information of a bare-metal, CHAP authentication information of a bare-metal, and the like.

The processing unit 210 may invoke and execute the program code and the data in the external memory 220, to implement operations such as establishing a storage network, configuring each switch and a storage device in the storage network, and allocating an IP address of a bare-metal. The processing unit 210 includes a processor 211, for example, a central processing unit (CPU). The CPU may use a complex instruction set computing (CISC) architecture (such as an x86 architecture), a reduced instruction set computing (RISC) architecture (such as an MIPS (Microprocessor without Interlocked Piped Stages) architecture), or the like.

The processing unit 210 may further include an internal memory 212, a chip set, a register, and the like.

The internal memory 212 is configured to store an instruction or data that is recently used or cyclically used by the processor 211, for example, a cache. If the processor 211 needs to use the instruction or the data again, the instruction or the data may be directly invoked from the internal memory 212, so that waiting time of the processor 211 is reduced, and system efficiency is improved. When content of a memory data page in the internal memory 212 is inconsistent with content on a data page in the memory 231, the memory data page may be referred to as a dirty page; and when the content of the memory data page in the internal memory 212 is consistent with the content on the data page in the memory 231, the memory data page may be referred to as a clean page.

The chip set may include a northbridge chip 214, configured to be responsible for data transmission between the processor 211 and the internal memory 212. In some embodiments, the chip set may further include a southbridge chip 213. One end of the southbridge chip 213 is connected to the processor 211 by using the northbridge chip 210, and the other end is connected to interfaces of various external devices. In some embodiments, the northbridge chip 214 may be integrated into the processor 211, some functions of the southbridge chip 213 are integrated into the northbridge chip 214, the southbridge chip 213 may be integrated into the processor 211, the southbridge chip 213 is integrated into the northbridge chip 214, or so on.

The register is a high-speed storage component with a limited storage capacity, and may be used to temporarily store OS status data such as an instruction, data, and an address, and is, for example, an instruction register (IR), a program counter (PC), and an accumulator (ACC).

Figure 10:
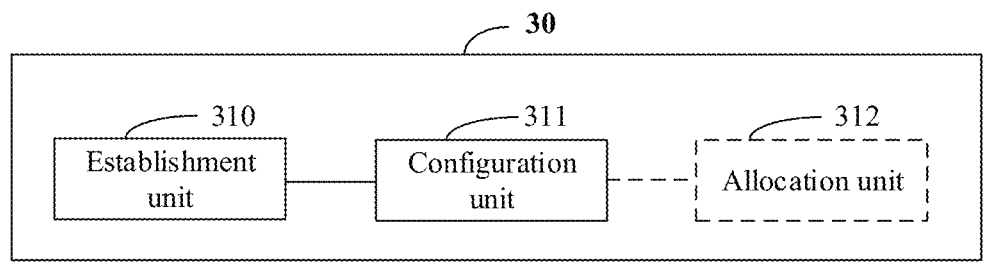
FIG. 10 is a schematic diagram of a functional structure of an apparatus according to an embodiment of this application.

FIG. 10 is a schematic diagram of a functional structure of an apparatus according to this application. An apparatus 30 includes an establishment unit 310 and a configuration unit 311. The apparatus 30 may be implemented through hardware, software, or a combination of software and hardware.

The establishment unit 310 is configured to establish a storage network. The storage network includes a plurality of bare-metals, an access switch, a core switch, and a storage device; the plurality of bare-metals are connected to the access switch, the plurality of access switches are connected to the core switch, and the core switch is connected to the storage device. The configuration unit 311 is configured to configure the storage network, so that each of the plurality of bare-metals is interconnected with the storage device, and any two of the plurality of bare-metals are separated from each other. In some possible embodiments, the apparatus 30 further includes an allocation unit 312, and the allocation unit 312 is configured to automatically configure IP of the bare-metal.

The functional modules of the apparatus 30 may be configured to implement the methods described in the embodiments in FIG. 3 to FIG. 7, the establishment unit 310 may be configured to implement networking of the storage network shown in any embodiment in FIG. 3 to FIG. 5, and the configuration unit 311 may be configured to implement configuration of the storage network shown in any embodiment in FIG. 3 to FIG. 5. In the embodiment in FIG. 6, the allocation unit 312 may be configured to perform S101 to S103. The functional modules of the apparatus 30 may be further configured to perform the method in the embodiment in FIG. 7. For brevity of the specification, details are not described herein again.

Figure 11:
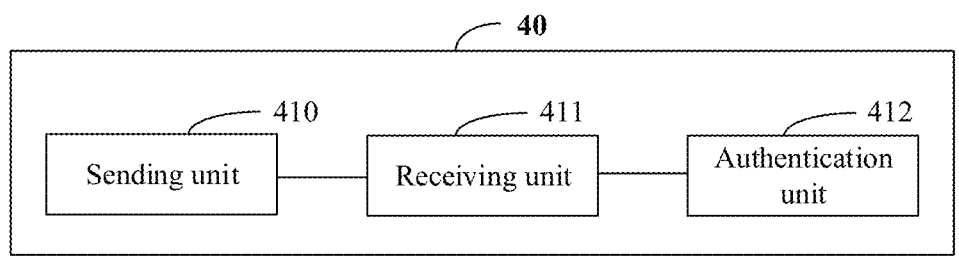
FIG. 11 is a schematic diagram of a functional structure of another apparatus according to an embodiment of this application.

FIG. 11 is a schematic diagram of a functional structure of an apparatus according to this application. An apparatus 40 includes a sending unit 410, a receiving unit 411, and an authentication unit 412. The apparatus 40 may be implemented through hardware, software, or a combination of software and hardware.

The sending unit 410 is configured to send challenge information to an apparatus 50. The receiving unit 411 is configured to receive response information sent by the apparatus 50. The authentication unit 412 is configured to perform CHAP authentication on an identity of the apparatus 50 based on the response information, to obtain a CHAP authentication result. The sending unit 410 is further configured to send the CHAP authentication result to the apparatus 50.

The functional modules of the apparatus 40 may be configured to implement the method described in the embodiment in FIG. 8. In the embodiment in FIG. 8, the sending unit 410 may be configured to perform S301 and S306, the receiving unit 411 may be configured to perform S303, and the authentication unit 412 is configured to perform S304 and S305. The functional modules of the apparatus 40 may be further configured to perform the method in the embodiment in FIG. 7. For brevity of the specification, details are not described herein again.

Figure 12:
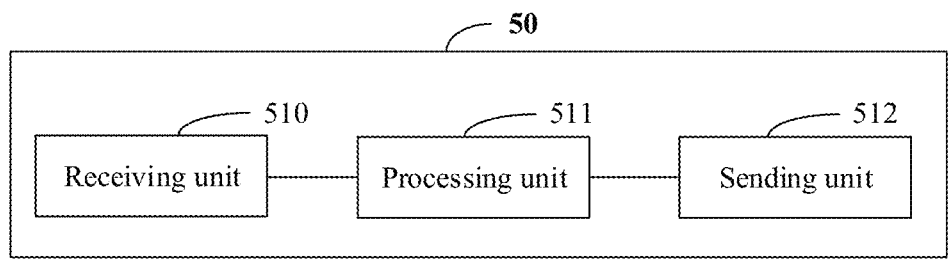
FIG. 12 is a schematic diagram of a functional structure of another apparatus according to an embodiment of this application.

FIG. 12 is a schematic diagram of a functional structure of an apparatus according to this application. An apparatus 50 includes a receiving unit 510, a processing unit 511, and a sending unit 512. The apparatus 50 may be implemented through hardware, software, or a combination of software and hardware.

The receiving unit 510 is configured to receive challenge information sent by an apparatus 40. The processing unit 511 is configured to process the challenge information to obtain a first hash value. The sending unit 512 is configured to send response information to the apparatus 40. The receiving unit 510 is further configured to receive a CHAP authentication result sent by the apparatus 40.

The functional modules of the apparatus 50 may be configured to implement the method described in the embodiment in FIG. 8. In the embodiment in FIG. 8, the receiving unit 510 may be configured to perform S301 and S306, the processing unit 511 may be configured to perform S302, and the sending unit 512 is configured to perform S303. The functional modules of the apparatus 50 may be further configured to perform the method in the embodiment in FIG. 7. For brevity of the specification, details are not described herein again.

In the foregoing embodiments in this specification, the descriptions of the embodiment have respective focuses. For a part that is not described in detail in an embodiment, refer to related descriptions in other embodiments.

It should be noted that a person of ordinary skill in the art may learn that all or some of the operations of the methods in the foregoing embodiments may be implemented by a program instructing relevant hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electronic erasable read-only memory (EEPROM), a compact disc read-only memory (CD-ROM) or another optical disc memory, a magnetic disk storage, a magnetic tape storage, or any other computer readable medium capable of carrying or storing data.

The technical solutions of this application essentially, or the part contributing to the conventional technology, or all or some of the technical solutions may be implemented in a form of a software product. The computer software product is stored in a storage medium and includes several instructions for instructing a device (which may be a personal computer, a server, a network device, a robot, a single-chip microcomputer, a chip, a robot, or the like) to perform all or some of the operations of the methods described in embodiments of this application.

What is claimed is:

1. A bare-metal connection storage method, wherein the method is applied to a cloud management platform, and the method comprises:
    establishing a storage network, wherein the storage network comprises a plurality of bare-metals, an access switch, a core switch, and a storage device, the plurality of bare-metals are coupled to the access switch, the access switch is coupled to the core switch, the core switch is coupled to the storage device, and the core switch is between the storage device and the plurality of bare-metals; and
    configuring the storage network, so that each of the plurality of bare-metals is coupled to the storage device, and a first bare-metal and a second bare-metal in the plurality of bare-metals are separately coupled to the access switch.

2. The method according to claim 1, wherein the configuring the storage network comprises:
    separating the first bare-metal and the second bare-metal on the access switch over a multiplex virtual local area network (MUX-VLAN), wherein the first bare-metal and the second bare-metal are located in a same VLAN and a same subnet.

3. The method according to claim 1, wherein the configuring the storage network comprises:
    setting a first access control list on the access switch to separate the first bare-metal and the second bare-metal, wherein the first bare-metal and the second bare-metal are separately coupled to the access switch, and the first bare-metal and the second bare-metal are located in a same VLAN and a same subnet.

4. The method according to claim 2, wherein the plurality of bare-metals further comprise a third bare-metal and a fourth bare-metal, and the configuring the storage network comprises:
    setting a second access control list on the core switch to separate the third bare-metal and the fourth bare-metal, wherein the third bare-metal and the fourth bare-metal are separately coupled to the core switch by using different access switches, and the third bare-metal and the fourth bare-metal are located in different subnets.

5. The method according to claim 1, wherein the configuring the storage network comprises:
setting a third access control list on the core switch, so that each of the plurality of bare-metals is intercoupled with the storage device, wherein each bare-metal and the storage device are located in different VLANs and different subnets.

6. The method according to claim 1, wherein when the storage network further comprises a computing node, the configuring the storage network further comprises:
setting a fourth access control list on the core switch, so that each of the plurality of bare-metals is separated from the computing node, wherein each bare-metal and the computing node are located in different VLANs and different subnets.

7. The method according to claim 1, wherein an IP address of each of the plurality of bare-metals is automatically configured based on a subnet of the access switch coupled to each bare-metal and a MAC address of each of the bare-metals.

8. The method according to claim 1, wherein after each of the plurality of bare-metals is intercoupled with the storage device, and before each bare-metal accesses the storage device, CHAP authentication initiated by the storage device on each of the bare-metals succeeds.

9. The method according to claim 8, wherein each of the plurality of bare-metals corresponds to one group of user names and user passwords used for the CHAP authentication, and different bare-metals correspond to different user names and different user passwords.

10. An apparatus, wherein the apparatus comprises a processor, a memory, wherein the memory is configured to store an instruction, and the processor is configured to invoke the instruction in the memory to:
establish a storage network, wherein the storage network comprises a plurality of bare-metals, an access switch, a core switch, and a storage device, the plurality of bare-metals are coupled to the access switch, the access switch is coupled to the core switch, the core switch is coupled to the storage device, and the core switch is between the storage device and the plurality of bare-metals; and
configure the storage network, so that each of the plurality of bare-metals is coupled to the storage device, and a first bare-metal and a second bare-metal in the plurality of bare-metals are separately coupled to the access switch.

11. The apparatus according to claim 10, wherein the processor is configured to invoke the instruction in the memory to:
separate the first bare-metal and the second bare-metal on the access switch over a multiplex virtual local area network (MUX-VLAN), wherein the first bare-metal and the second bare-metal are located in a same VLAN and a same subnet.

12. The apparatus according to claim 10, wherein the plurality of bare-metals comprise a first bare-metal and a second bare-metal, and the processor is configured to invoke the instruction in the memory to:
set a first access control list on the access switch to separate the first bare-metal and the second bare-metal, wherein the first bare-metal and the second bare-metal are separately coupled to the access switch, and the first bare-metal and the second bare-metal are located in a same VLAN and a same subnet.

13. The apparatus according to claim 11, wherein the plurality of bare-metals further comprise a third bare-metal and a fourth bare-metal, and the processor is configured to invoke the instruction in the memory to:
set a second access control list on the core switch to separate the third bare-metal and the fourth bare-metal, wherein the third bare-metal and the fourth bare-metal are separately coupled to the core switch by using different access switches, and the third bare-metal and the fourth bare-metal are located in different subnets.

14. The apparatus according to claim 10, wherein the processor is configured to invoke the instruction in the memory to:
set a third access control list on the core switch, so that each of the plurality of bare-metals is intercoupled with the storage device, wherein each bare-metal and the storage device are located in different VLANs and different subnets.

15. The apparatus according to claim 10, wherein when the storage network further comprises a computing node, the processor is configured to invoke the instruction in the memory to:
set a fourth access control list on the core switch, so that each of the plurality of bare-metals is separated from the computing node, wherein each bare-metal and the computing node are located in different VLANs and different subnets.

16. The apparatus according to claim 10, wherein an IP address of each of the plurality of bare-metals is automatically configured based on a subnet of the access switch coupled to each bare-metal and a MAC address of each of the bare-metals.

17. The apparatus according to claim 10, wherein after each of the plurality of bare-metals is intercoupled with the storage device, and before each bare-metal accesses the storage device, CHAP authentication initiated by the storage device on each of the bare-metals succeeds.

18. The apparatus according to claim 17, wherein each of the plurality of bare-metals corresponds to one group of user names and user passwords used for the CHAP authentication, and different bare-metals correspond to different user names and different user passwords.

19. A bare-metal storage system, wherein the storage system comprises a plurality of bare-metals, an access switch, a core switch, and a storage device, the plurality of bare-metals are coupled to the access switch, the access switch is coupled to the core switch, the core switch is coupled to the storage device, and the core switch is between the storage device and the plurality of bare-metals; and
each of the plurality of bare-metals is coupled to the storage device, and a first bare-metal and a second bare-metal in the plurality of bare-metals are separately coupled to the access switch.

20. The system according to claim 19, wherein
a multiplex virtual local area network (MUX-VLAN) is set on the access switch, the MUX-VLAN enables the first bare-metal to be separated from the second bare-metal, and the first bare-metal and the second bare-metal are located in a same VLAN and a same subnet.

* * * * *